United States Patent
Yokoyama et al.

(12)

(10) Patent No.: US 8,013,107 B2
(45) Date of Patent: Sep. 6, 2011

(54) PROCESS FOR PRODUCING POLYALKYLENE TEREPHTHALATE, PROCESS FOR PRODUCING POLYALKYLENE TEREPHTHALATE MOLDING AND POLYALKYLENE TEREPHTHALATE MOLDING

(75) Inventors: Hiroshi Yokoyama, Okayama (JP); Katsuhiro Fujimoto, Yokohaya (JP); Muneaki Aminaka, Okayama (JP); Junichi Sugimoto, Nishitokyo (JP); Tsutomu Katsumata, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 839 days.

(21) Appl. No.: 10/575,226

(22) PCT Filed: Oct. 7, 2004

(86) PCT No.: PCT/JP2004/014869
§ 371 (c)(1),
(2), (4) Date: Jul. 11, 2008

(87) PCT Pub. No.: WO2005/035620
PCT Pub. Date: Apr. 21, 2005

(65) Prior Publication Data
US 2008/0274320 A1 Nov. 6, 2008

(30) Foreign Application Priority Data

Oct. 10, 2003 (JP) ................. 2003-352531
Nov. 12, 2003 (JP) ................. 2003-382473

(51) Int. Cl.
*C08G 64/00* (2006.01)
*C08G 63/02* (2006.01)

(52) U.S. Cl. ........ 528/271; 428/364; 428/372; 528/272; 606/77; 606/230

(58) Field of Classification Search ............ 428/364, 428/372; 528/271, 272; 606/77, 230
See application file for complete search history.

(56) References Cited

U.S. PATENT DOCUMENTS

| 3,110,547 A | 11/1963 | Emmert et al. |
| 4,223,128 A | 9/1980 | Halek et al. |
| 5,597,891 A | 1/1997 | Nelson et al. |

FOREIGN PATENT DOCUMENTS

| EP | 1 095 960 | 5/2001 |
| JP | 48-8355 | 3/1973 |
| JP | 48-102894 | 12/1973 |
| JP | 53-17569 | 2/1978 |
| JP | 58-45228 | 3/1983 |
| JP | 61-36776 | 8/1986 |
| JP | 4-58806 | 9/1992 |
| JP | 9-77857 | 3/1997 |
| JP | 2000-117819 | 4/2000 |
| JP | 2000-506199 | 5/2000 |
| JP | 2000-319365 | 11/2000 |
| JP | 2001-516389 | 9/2001 |
| JP | 2002-514239 | 5/2002 |
| JP | 3345250 | 8/2002 |
| JP | 2003-119266 | 4/2003 |
| WO | 97/31968 | 9/1997 |
| WO | 99/65970 | 12/1999 |

OTHER PUBLICATIONS

Office Action issued Aug. 12, 2008 in corresponding Indian Patent Application.
European Patent Office Action, mailed Feb. 22, 2008 and issued in corresponding European Patent Application No. 04792166.

*Primary Examiner* — Terressa M Boykin
(74) *Attorney, Agent, or Firm* — Staas & Halsey LLP

(57) ABSTRACT

The present invention provides a method of producing polyalkylene terephthalate, which comprises: introducing a prepolymer of polyalkylene terephthalate that is in a molten state comprising 70 mol % or more of ethylene terephthalate or 1,4-butylene terephthalate repeating units and having an intrinsic viscosity [η] between 0.2 and 2 dl/g through a feed opening to a polymerization reactor; discharging the introduced prepolymer from holes of a perforated plate; and polymerizing the prepolymer under reduced pressure, while allowing the prepolymer to fall along the surface of a support that is open towards the outside at a temperature between the [crystalline melting point−10° C.] of the prepolymer or higher and the [crystalline melting point+30° C.] of the prepolymer or lower under the conditions represented by a formula $S_1/S_2 > 1$, wherein $S_1$ is the surface area of falling polyalkylene terephthalate, and $S_2$ is the area where the support is in contact with polyalkylene terephthalate.

11 Claims, 6 Drawing Sheets

PROCESS FOR PRODUCING POLYALKYLENE TEREPHTHALATE, PROCESS FOR PRODUCING POLYALKYLENE TEREPHTHALATE MOLDING AND POLYALKYLENE TEREPHTHALATE MOLDING

This application is based on and hereby claims priority to PCT Application No. PCT/JP2004/014869 filed on Oct. 7, 2004 and Japanese Application Nos. 2003-352531 & 2003-382473 filed on Oct. 10, 2003 & Nov. 12, 2003 respectively, the contents of which are hereby incorporated by reference.

TECHNICAL FIELD

The present invention relates to a method of producing polyalkylene terephthalate, a method of producing a molded article of polyalkylene terephthalate, and a molded article of polyalkylene terephthalate.

BACKGROUND ART

Polyalkylene terephthalate (hereinafter abbreviated as "PArT"), which includes polyethylene terephthalate (hereinafter abbreviated as "PET") and polybutylene terephthalate (hereinafter abbreviated as "PBT") as representative examples, has characteristics such as excellent heat resistance, weather resistance, mechanical properties, and transparency. Making use of such characteristics, PArT has widely been used not only for fiber or magnetic tapes, but also for preforms used to produce beverage containers, injection molded articles used for various purposes, or extrusion molded articles such as wrapping films or sheets. In particular, a hollow body produced by blow molding of a preform has excellent characteristics in terms of light weight, impact resistance, transparency, and the like. Accordingly, such hollow bodies have increasingly been used for containers for various types of beverages such as carbonated drinks, juice, tea, or mineral water, or containers for liquid condiments of foods such as soy sauce, sauce, salad oil, cosmetics, or liquid detergent. It is expected that the market will further expand in the future. It is required that such containers not affect the taste of the contents thereof, as well as having excellent strength, impact resistance, and transparency. Thus, it is required that PArT used for the aforementioned purposes be of high quality such that it has a high polymerization degree, is not colored, and contains a very small amount of impurities such as acetaldehyde. In addition, it is strongly desired that such PArT be able to be produced in an industrially stable manner and with good productivity at a low cost.

As a method of producing PArT used for the aforementioned purposes, a lower alcohol diester of PTA such as terephtalic acid (hereinafter abbreviated as "PTA") or dimethyl terephthalate (hereinafter abbreviated as "DMT") and alkylene glycol such as ethylene glycol (hereinafter abbreviated as "EG") are subjected to a transesterification or direct esterification in the absence or presence of a catalyst such as a metal carboxylate, so as to produce an intermediate such as bis-$\beta$-hydroxyethyl terephthalate (hereinafter abbreviated as "BHET") or its oligomer in advance. Thereafter, the above intermediate or oligomer, which is in a molten state, is heated under reduced pressure in the presence of a polycondensation reaction catalyst. While alkylene glycol generated as a by-product is discharged from the reaction system, melt polymerization is then carried out until the desired polymerization degree is achieved, so as to produce PArT.

Alternatively, a polymer pellet with a medium polymerization degree is produced by the above described melt polymerization, and it is then heated in a solid state, under reduced pressure, or in an inert gas current. Thereafter, solid phase polymerization is carried out by discharging alkylene glycol generated as a by-product from the reaction system for high polymerization, so as to produce PArT (see e.g. Patent Document 1).

In order to obtain a molded article by solid phase polymerization, however, a polymer pellet with a medium polymerization degree, which is solidified by cooling after melt polymerization, is heated again to a high temperature, and then dried, and crystallized. Thereafter, it is subjected to solid phase polymerizetion for a long period of time, so as to obtain a pellet with a high polymerization degree. Thereafter, the obtained pellet is cooled again, transported, and conserved. It is then heated and dried again to supply to a melt molding machine, so that a final molded article, or a preform used to produce a container, is molded. Thus, complex processes are required for production of PArT.

Although such complex processes have been required, solid phase polymerization has conventionally been carried out. That is because a low polymerization temperature results in the low likelihood of a pyrolysis reaction, and coloration or decomposition products are thereby hardly generated. Moreover, since volatile impurities are volatilized and eliminated from a polymer during polymerization, a high-quality polymer can be produced. However, this technique is problematic in that it requires special and complex equipment or methods as well as a long period of time. Moreover, the technique is also problematic in that it requires an enormous a mount of energy for repeating heating and cooling so many times. Furthermore, such solid phase polymerization is also problematic in that a large amount of powder polymer that is hardly melted is generated during the polymerization, and in that the thus generated polymer plays a role in foreign matter, which might inhibit molding or might deteriorate the quality of a molded article, such as in terms of surface properties, resistance, or transparency. Still further, it is also problematic in that since strict conditions such as a high temperature or high shearing are required when a pellet with a high degree of crystallinity is subjected to melt processing, although a high-quality polymer can be produced, the quality of a molded article is then significantly deteriorated.

To date, an attempt to obtain PArT with a high polymerization degree only by melt polymerization without performing solid phase polymerization has also been carried out. Since an equilibrium constant is very small in the polycondensation reaction of PArT, a polymerization degree can be increased only after eliminating alkylene glycol generated as a by-product from the reaction system. However, since high polymerization brings on a high viscosity, it becomes more difficult to eliminate alkylene glycol. Thus, there has been a technique of using a horizontal agitator, which enables surface renewal of a large and sufficient surface area of a reaction solution in a final polycondensation reaction vessel that causes a high polymerization degree (see e.g. Patent Documents 2 and 3). Using such a technique, PArT with a high polymerization degree can be obtained, but a technique of using a polymerization apparatus having a rotary drive portion in the main body thereof, such as a horizontal agitator, has the following disadvantages.

When polymerization is carried out in a high vacuum, since the rotary drive portion cannot be completely sealed, inflow of a trace amount of air cannot be prevented, and polymer coloration thereby becomes inevitable. Even when a sealing solution is used to prevent such inflow of air, mixing of the sealing solution is inevitable, and thus, the quality of a polymer is inevitably deteriorated. Moreover, even when high sealing properties are kept at the beginning of the operations, the sealing properties might be decreased during long-term operations. Thus, there is also a serious problem regarding maintenance.

Furthermore, it is also difficult to reduce the content of impurities such as acetaldehyde, which is emphasized especially in the field of beverage containers. That is because acetaldehyde is likely to be generated as a by-product due to inflow of the air, and also because since an industrial-scale apparatus, including a horizontal agitator, causes a great depth of liquid, impurities such as acetaldehyde remain in a polymer.

With regard to acetaldehyde, a technique of compulsively removing acetaldehyde from PET obtained by melt polymerization by a melt deaeration treatment or the like, and directly molding a preform in a molten state, has been recently proposed.

For example, a thermoplastic polyester obtained by melt polymerization is subjected to a deaeration treatment without substantial increase in an intrinsic viscosity, so as to decrease the concentration of acetaldehyde, and thereafter, a preform is molded (see Patent Document 4). In this technique, however, since an extruder with a vent is used in deaeration, a polyester with a high polymerization degree has an excessively high viscosity, and acetaldehyde cannot be sufficiently reduced. In addition, a polymer locally has a high temperature due to heating by shearing or a heater, strong coloration occurs due to inflow of the air from an axial sealing portion, as stated above, or a large amount of decomposition products are generated. A technique of adding a phosphate-containing compound to prevent coloration has also been proposed, but it cannot sufficiently enhance quality.

Moreover, there has been another technique whereby inert gas is injected into a polyester molten body with an intrinsic viscosity between 0.5 and 0.75 dl/g, and melt polymerization is then carried out in a polymerization reactor at a temperature between 260° C. and 285° C. under reduced pressure, so as to form a polyester molten body containing low acetaldehyde with an intrinsic viscosity between 0.75 and 0.95 dl/g, followed by injection molding of the obtained polyester molten body (see Patent Document 5). However, according to the studies of the present inventors, since a horizontal biaxial agitator-type reactor is used as a polymerization reactor in this technique, a long period of time is required for high polymerization. Further, inflow of the air from the axial sealing portion causes significant coloration. In addition, since an industrial-scale reactor causes a great depth of liquid, high polymerization is further difficult, and it also becomes impossible to reduce acetaldehyde. It is also extremely difficult to uniformly inject into a polyester molten body inert gas in an amount sufficient for deaeration in a horizontal reactor on an industrial scale.

Furthermore, there has been another technique whereby a polyester polymerized in a reactor is supplied to a mixer without solidifying it at midpoint, acetaldehyde-eliminating agents such as nitrogen or carbon monoxide are then injected into the mixer, acetaldehyde is then eliminated in a flash tank, and the residue is then transported to a molding machine, so as to obtain a molded article (see Patent Document 6). In this technique, a polyester into which a stripping agent is mixed is converted into a large number of strands, filaments, or ribbons through a die, and the thus obtained products are extruded into a flash tank in a reduced-pressure atmosphere. The thus extruded product is allowed to fall onto the bottom of the flash tank, and then it is allowed to intensively foam, so as to eliminate acetaldehyde. Regarding this technique, the form of the polymerization reactor is not described in detail. However, if a common horizontal double axis agitator-type reactor was used in this technique, a long period of time would be required for high polymerization, and further, inflow of the air from an axial sealing portion would cause significant coloration. Further, since this technique requires special auxiliary equipment such as a mixer or flash tank as well as a reactor, the processes become complicated. Furthermore, since such a mixer or flash tank has a space where a polymer can remain for a long time, pyrolysis locally progresses, and a depleted polymer that is significantly colored is mixed into a product.

Still further, there has been another technique of transporting a resin in a molten state from a polymerization machine to a molding machine and then molding it (see Patent Document 7). However, a horizontal agitating polymerization machine is used in this method. Therefore, long-term polymerization is required to achieve a high polymerization degree, and inflow of the air from an axial sealing portion causes significant coloration. A devolatilizer for eliminating acetaldehyde, etc. is essential in this method, but a polymer is required to remain in such a devolatilizer for a further period of time, so that the product is deteriorated in color and that the production cost also increases.

Still further, there has been another technique of adding an acetaldehyde scavenger as well as a devolatilizer for eliminating acetaldehyde (see Patent Document 8). However, the use of a large amount of such an acetaldehyde scavenger causes problems such as generation of odor and coloration derived from the scavenger.

As stated above, the conventional melt polymerization techniques can reduce volatile impurities such as acetaldehyde, but they cannot achieve a PArT molded article, which has a high polymerization degree and a good hue.

Other than the above described technique of using a polymerization apparatus comprising a rotary drive portion in the main body thereof, a method of performing polymerization while allowing a prepolymer to fall by gravitation from the upper part of a polymerization reactor, so as to produce PET with a high polymerization degree by melt polymerization, has also been proposed from a long time ago.

For example, there has been a technique whereby filamentary polyester is allowed to fall into a vacuum space, so as to produce a polyester with a desired molecular weight (see Patent Document 9). In this technique, since recirculation of the fallen polymer results in deterioration of the quality of the produced polyester, polymerization is completed by one-pass operation. However, since it is extremely difficult to keep a sufficient polymerization time by such a method, it is also extremely difficult to obtain a polymer with a high polymerization degree. In addition, filaments are easily cut off in a polymerization reactor. This is problematic in that the quality of the obtained polymer is drastically fluctuated; and in that condensates with a low molecular weight scattered from the filaments contaminate the nozzle surface, and it becomes difficult for the filaments to be injected directly below from the nozzle due to such contamination, and as a result, the filaments come into contact with one another and are cut off, or they are gathered to become a thick filament and it is then fallen, so that it prevents the reaction.

In order to solve such inconveniences, as a continuous polycondensation method of BHET as an initial condensate of PET and/or an initial condensate as an oligomer thereof, there has been proposed a method involving polymerizing the above materials at a reactor temperature of 340° C., while allowing the materials to fall by gravitation along a linear object that is vertically hung from a nozzle in an atmosphere where inert gas is circulated (see Patent Document 10). However, according to the studies of the present inventors, EG generated as a by-product cannot be eliminated from the reaction product at a sufficient rate in such an atmosphere where inert gas is circulated. Thus, a polymer with a high polymerization degree required for beverage containers cannot be obtained. Furthermore, pyrolysis significantly occurs at a high temperature such as 340° C., and only a polymer that is colored so as to become yellow can be obtained.

In addition to the above described methods, as a method of producing a polyester and a polyamide, there has also been a method of performing polymerizetion while allowing a polymer to fall by gravitation along a linear support vertically disposed in a reactor (see Patent Document 11). Moreover, as a method of producing a polyester, there has also been a technique whereby a PET oligomer with a mean degree of polymerization between 8 and 12 (which corresponds to an intrinsic viscosity of 0.1 dl/g or less) is supplied at 285° C., the oligomer is allowed to fall by gravitation along a cylindrical wire gauze vertically disposed in a reactor, and at the same time, polymerization is carried out under reduced pressure in the reactor (see Patent Document 12). Furthermore, there has also been proposed a method and an apparatus of allowing a PET prepolymer with a melting viscosity of 0.5 Pa·s (which corresponds to an intrinsic viscosity of 0.1 dl/g or less) to absorb inert gas, allowing the prepolymer to fall by gravitation along a guide under reduced pressure, and at the same time, performing polymerization (see Patent Document 13).

However, according to the studies of the present inventors, a polymer with a polymerization degree of interest cannot be obtained by directly applying the above described method in industrial-scale equipment. Moreover, a polymer discharged from a perforated plate or the like intensively foams, and it contaminates the wall of the reactor provided with the support and the nozzle surface. Such contaminants are decomposed, modified, or colored during long-term operations, and these degradation products are mixed into a polymer, so that the quality of a product deteriorates.

Other than these methods, there has also been proposed a polymerization method wherein the temperature of a reaction product is continuously decreased as the reaction product falls when bis-hydroxyethyl terephthalate or an oligomer thereof is supplied to a wetted-wall column followed by continuous polymerization under reduced pressure, and at the same time, vacuum aspiration is carried out from the lower portion of the column (see Patent Document 14). However, according to the studies of the present inventors, a polymer with a high polymerization degree cannot be obtained by applying the above method. When the amount of a prepolymer supplied is decreased to improve a polymerization velocity, a drift (biased flow) of the prepolymer occurs, and thus, a high-quality polymer cannot be obtained.

Hence, the conventional gravity falling-type melt polymerization techniques (Patent Documents 9 to 14) could not provide a method of industrially stably producing a high-quality PArT having a high polymerization degree with good productivity, which can be substituted for the solid phase polymerization technique. In addition, these gravity falling-type melt polymerization techniques give no suggestion regarding a technique of obtaining a molded article containing small quantities of low molecular weight volatile substances such as acetaldehyde.

[Patent Document 1] JP-A-58-45228
[Patent Document 2] JP-A-48-102894
[Patent Document 3] JP-A-9-77857
[Patent Document 4] JP-A-2000-117819
[Patent Document 5] Japanese Patent No. 3345250
[Patent Document 6] National Publication of International Patent Application No. 2001-516389
[Patent Document 7] National Publication of International Patent Application No. 2000-506199
[Patent Document 8] National Publication of International Patent Application No. 2002-514239
[Patent Document 9] U.S. Pat. No. 3,110,547
[Patent Document 10] JP-B-4-58806
[Patent Document 11] JP-A-53-17569
[Patent Document 12] JP-B-48-8355
[Patent Document 13] International Publication WO99/65970 pamphlet
[Patent Document 14] Japanese Patent No. 1369651

DISCLOSURE OF THE INVENTION

It is an object of the present invention to provide: a method of industrially stably producing high-quality PArT with a high polymerization degree with good productivity at a low cost; a method of industrially stably producing a molded article of high-quality PArT with a high polymerization with good productivity at a low cost; and a high-quality PET resin with a high polymerization degree containing a small amount of volatile components that is suitable for producing containers for beverages or the like, a preform produced from the PET resin, and a hollow body produced from the PET resin.

The present inventors have intensively studied to solve the above described problems. As a result, they have surprisingly found that an appropriate prepolymer is polymerized while it is allowed to fall along a support under specific conditions, so as to produce at a low cost a high-quality PArT with a high polymerization degree that can be substituted for solid phase polymerization, and that the obtained PArT in a molten state is transported to a molding machine followed by molding, so as to produce a high-quality molded article thereof at a further low cost. The present inventors have also found the possibility of production of a PET resin containing a small amount of volatile components that is suitable for producing containers for beverages or the like, a preform produced from the PET resin, and a hollow body produced from the PET resin, thereby completing the present invention.

That is to say, the present invention has the following features:

(1) A method of producing polyalkylene terephthalate, which comprises: introducing a prepolymer of polyalkylene terephthalate that is in a molten state comprising 70 mol % or more of ethylene terephthalate or 1,4-butylene terephthalate repeating units and having an intrinsic viscosity [η] between 0.2 and 2 dl/g through a feed opening into a polymerization reactor; discharging the introduced prepolymer through holes of a perforated plate; and then polymerizing the prepolymer under reduced pressure, while allowing the prepolymer to fall along the surface of a support that is open towards the outside at a temperature between the [crystalline melting point−10° C.] of the prepolymer or higher and the [crystalline melting point+30° C.] of the prepolymer or lower under the conditions represented by the following formula (1);

$$S_1/S_2 > 1 \qquad (1)$$

wherein $S_1$: the surface area of falling polyalkylene terephthalate, and $S_2$: the area where the support is in contact with polyalkylene terephthalate.

(2) The method of producing polyalkylene terephthalate according to (1) above, wherein the prepolymer of polyalkylene terephthalate used in polymerization has an intrinsic viscosity [η] between 0.4 and 2.0 dl/g and a carboxyl-terminal group concentration of 150 meq/kg or less.

(3) The method of producing polyalkylene terephthalate according to (1) or (2) above, which comprises introducing inert gas into a polymerization reactor by either the following step (A) or (B), or by both steps, and at the same time polymerizing the prepolymer of polyalkylene terephthalate under reduced pressure, while allowing the prepolymer to fall along the support;

(A) directly introducing the inert gas into the polymerization reactor that is under reduced pressure; and (B) discharging under reduced pressure the prepolymer of polyalkylene terephthalate that has previously absorbed and/or contained the inert gas, so as to release the inert gas, thereby introducing it into the polymerization reactor.

(4) A method of producing a molded article of polyalkylene terephthalate comprising 70 mol % or more of alkylene terephthalate repeating units, which comprises: introducing a prepolymer of polyalkylene terephthalate that in a molten state into a polymerization reactor; polymerizing the prepolymer under reduced pressure, while allowing the prepolymer to fall along the surface of a support that is open towards the outside; and then transporting the prepolymer in molten state to a molding machine followed by performing melt molding.

(5) The method of producing a molded article of polyalkylene terephthalate according to (4) above, wherein the molded article of polyalkylene terephthalate is one or more selected from the group consisting of a preform for molding a hollow body, a hollow body, a film, a sheet, a fiber, and a pellet.

(6) A molded article of polyalkylene terephthalate, which is produced by the method according to (4) above.

(7) The molded article of polyalkylene terephthalate according to (6), wherein the molded article of polyalkylene terephthalate is one or more selected from the group consisting of a preform for molding a hollow body, a hollow body, a film, a sheet, a fiber, and a pellet.

(8) Polyethylene terephthalate comprising 70 mol % or more of ethylene terephthalate repeating units, which has the following characteristics (C) to (F):

(C) an intrinsic viscosity [η] ranging between 0.5 and 2.0 dl/g;

(D) a molecular weight distribution represented by Mw/Mn ranging between 1.8 and 2.2;

(E) an L-value and a b-value, which are obtained by measuring optical transmission of a solution prepared by dissolving the polyethylene terephthalate in HFIP at a concentration of 13% by weight, ranging between 99 and 100, and between −0.5 and 0.5, respectively; and (F) the content of acetaldehyde at 10 ppm or less.

(9) The polyethylene terephthalate according to (8) above, wherein the amount of oligomers contained in the polyethylene terephthalate is within a range between 0.5 and 5.0% by weight.

(10) A molded article of polyethylene terephthalate produced from the polyethylene terephthalate according to (8) or (9), which has a form selected from the group consisting of a preform for molding a hollow body, a hollow body, a film, a sheet, a fiber, and a pellet.

(11) The molded article of polyethylene terephthalate according to (10) above, wherein said molded article of polyethylene terephthalate is a pellet, and the content of acetaldehyde in a molded article obtained by injection molding of the pellet at a molding temperature of 280° C. is 15 ppm or less.

By using the melt polymerization method and molding method of the present invention, PArT with a small degree of coloration and with a high polymerizetion degree that can be substituted for solid phase polymerization can be industrially stably produced at a low cost. In addition, the PArT in a molten state is transported to a molding machine and molded, so as to produce a high-quality molded article at a further low cost. Moreover, it is also possible to industrially stably produce, with good productivity, a PET resin, which is suitable for producing containers for beverages or the like, contains a small amount of volatile components, and does not affect the taste of the contents thereof, a preform produced from the PET resin, and a hollow body produced from the PET resin.

DESCRIPTION OF SYMBOLS

Figure 1:
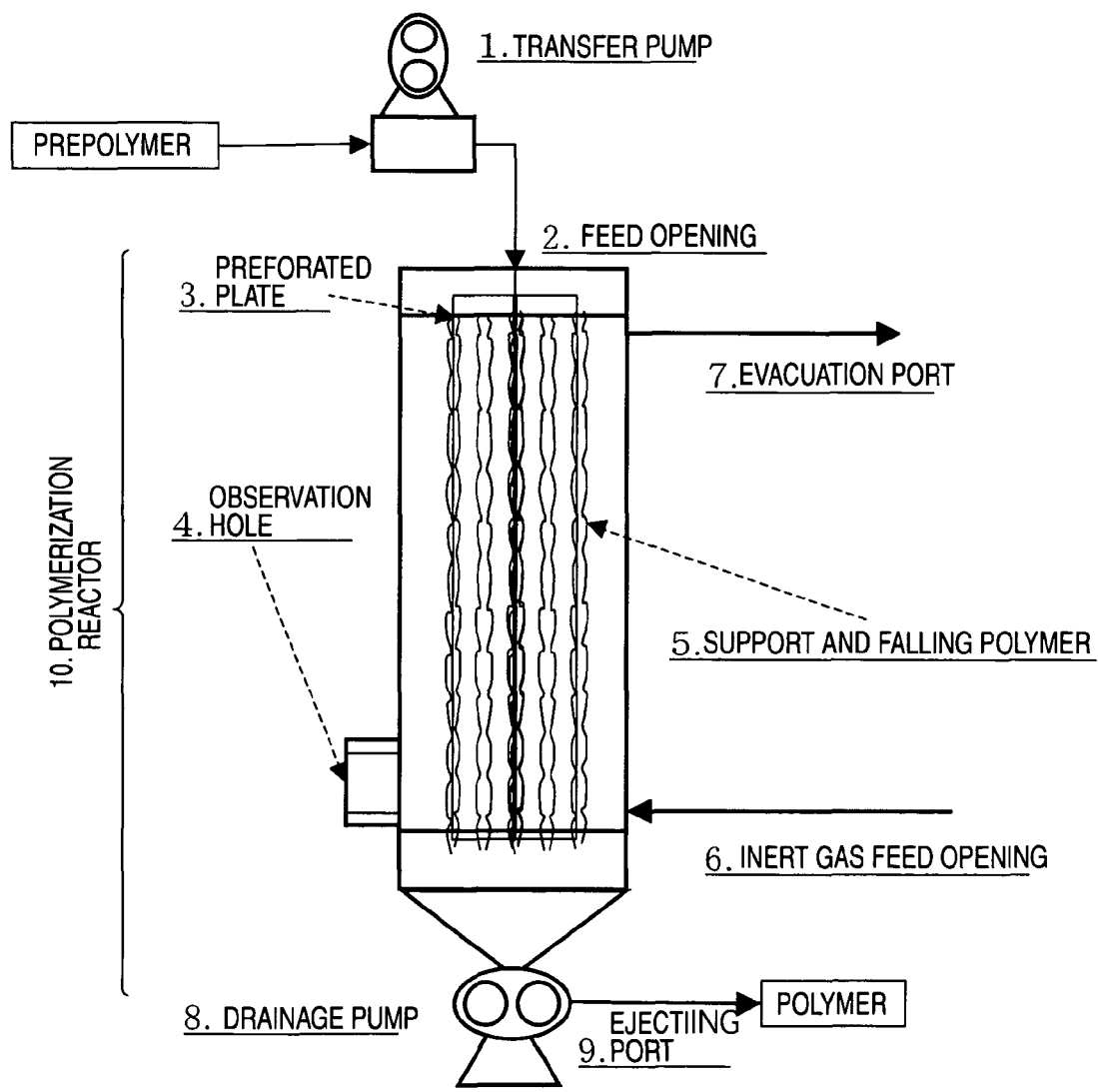
FIG. 1 is a schematic view showing an example of the polymerization reactor used in the present invention.

1 Transfer pump
2 Feed opening
3 Perforated plate
4 Observation hole
Support and falling polymer
6 Inert gas feed opening
7 Evacuation port
8 Drainage pump
9 Ejecting port
10 Polymerization reactor
N1 Transfer pump
N2 Feed opening
N3 Perforated plate
N5 Support and falling polymer
N6 Inert gas-introducing port
N7 Evacuation port
N8 Drainage and transfer pump
N10 Inert gas absorption device
P1 Esterification reactor
P2 Agitation blade
P3 Evacuation port
P4 Transfer pump
P5 First agitation vessel polymerization reactor
P6 Agitation blade
P7 Evacuation port
P8 Transfer pump
P9 Secondary agitation vessel polymerization reactor
P10 Agitation blade
P11 Evacuation port
E1 First transesterification reactor
E2 Agitation blade E3 Evacuation port
E4 Transfer pump
E5 Secondary transesterification reactor
E6 Agitation blade
E7 Evacuation port
E8 Transfer pump
E9 First agitation vessel polymerization reactor
E10 Agitation blade
E11 Evacuation port
E12 Transfer pump
E13 Horizontal agitating polymerization
E14 Agitation blade
E15 Evacuation port
I1 Transfer tube and distributor
I2 Molding machine A
I3 Molding machine B
I4 Molding machine C

BEST MODE FOR CARRYING OUT THE INVENTION

The present invention will be specifically described below.

The PArT of the present invention is defined as one comprising 70 mol % or more of ethylene terephthalate or 1,4-butylene terephthalate repeating units. The PArT also includes one comprising 30 mol % or less of one or more types of other copolymerizing components. Examples of such a copolymerizing component may include ester-forming monomers such as 5-sodiumsulfoisophthalic acid, 3,5-dicarboxylic acid benzenesulfonic acid tetramethylphosphonium salt, 1,4-cyclohexanedicarboxylic acid, 2,6-naphthalenedicarboxylic acid, p-phenylenedicarboxylic acid, p-hydroxybenzoic acid, 6-hydroxy-2-naphthalenecarboxylic acid, 1,3-butanediol, 1,4-butanediol, neopentylglycol, 1,6-hexamethylene glycol, 1,4-cyclohexanediol, 1,4-cyclohexanedimethanol, isophthalic acid, o-phthalic acid, trimellitic acid, pyromellitic acid, oxalic acid, succinic acid, adipic acid, dodecanedioic acid, fumaric acid, maleic acid, or 1,4-cyclohexanedicarboxylic acid, polyethylene glycol, polypropylene glycol, polytetramethylene glycol, and copolymers thereof. Moreover, the PArT of the present invention may also include one comprising cyclic or linear oligomers, monomers such as DMT, TPA, or EG, and various types of additives as well as PArT itself.

In the present invention, a previously polymerized PArT prepolymer that is in a molten state is supplied to a polymerization reactor, so as to polymerize a PArT resin with a desired polymerization degree. The term "PArT prepolymer" is used herein to mean a polymer at an early stage of polymerization, which has a lower polymerization degree than that of a PArT product.

Preferred methods of industrially producing the PArT prepolymer of the present invention are broadly classified into two methods in terms of a difference in raw materials: a "transesterification method" wherein a lower alcohol diester of PTA and alkylene glycol are subjected to a transesterification to obtain bis-hydroxyalkyl terephthalate as an intermediate of PArT, and the intermediate is then subjected to a polycondensation reaction, so as to produce a PArT prepolymer; and a "direct esterification method" wherein TPA and alkylene glycol are subjected to an esterification to obtain an intermediate, and the intermediate is then subjected to a polycondensation as with the first method, so as to produce PArT prepolymer. Such an intermediate may include unreacted TPA, a lower alcohol ester of TPA, alkylene glycol, and a PArT oligomer. It is preferable that 70% or more by weight of the total reaction product be an intermediate or low molecular weight PArT oligomer.

Moreover, when applicable methods are broadly divided in terms of a difference in production system, there can be the following two methods: a batch polymerization method (referred to also as a batch-wise method) wherein materials and the like are all supplied to a reactor, and all these materials are simultaneously reacted to obtain a PArT prepolymer; and a continuous polymerization method wherein materials are continuously supplied to a reactor, so as to continuously obtain a PArT prepolymer. In the present invention, it is more preferable that a PArT prepolymer be obtained by the continuous polymerization method and that the obtained prepolymer be continuously polymerized by the method of the present invention, so as to obtain a product with a high polymerization degree.

An example of a method of obtaining the above described intermediate will be described in detail below.

First, the "transesterification method" will be described.

In the transesterification method, a lower alcohol diester of TPA and alkylene glycol are subjected to a transesterification in the presence of a transesterification catalyst at a temperature between 160° C. and 290° C., so as to obtain an intermediate. In the transesterification method, since DMT as a material has a high volatility, it is preferable that a reactor be divided into two or more units and that a temperature be changed depending on a rate of reaction.

In order to shorten a reaction time and to obtain a good-quality polymer, when a lower alcohol diester of TPA and alkylene glycol are supplied, the molar ratio of both components is preferably between 1:1.2 and 1:4, and more preferably 1:1.4 and 1:2.5.

It is necessary to use a transesterification catalyst in the trasesterification method, and previously known catalysts can be used herein. Examples of a preferred catalyst may include: titanium alkoxides including titanium tetrabutoxide and titanium tetraisopropoxide as typical examples; tin compounds such as tin 2-ethylhexanoate; manganese acetate; cobalt acetate; calcium acetate; and zinc acetate. Of these, manganese acetate and calcium acetate are preferable to obtain a good-quality polymer. The amount of a transesterification catalyst is preferably between 0.01 and 0.5% by weight, more preferably between 0.02 and 0.3% by weight, and most preferably between 0.03 and 0.1% by weight, with respect to a lower alcohol diester of TPA.

Next, a method of obtaining an intermediate by the "direct esterification method" will be described.

In the direct esterification method, TPA and alkylene glycol are subjected to an esterification at a temperature between 150° C. and 320° C., so as to obtain an intermediate.

When TPA and alkylene glycol are supplied, the molar ratio of both components is preferably between 1:1.01 and 1:3, and more preferably 1:1.03 and 1:2. A reaction time can be shortened by setting the molar ratio within the above range.

In the direct esterification method, since protons releasing from TPA function as catalysts, an esterification catalyst is not always necessary. However, there is also a case where an esterification catalyst is used to enhance a reaction rate. Examples of such an esterification catalyst may include: titanium alkoxides including titanium tetrabutoxide and titanium tetraisopropoxide as typical examples; and tin compounds such as tin 2-ethylhexanoate. The additive amount of an esterification catalyst is preferably between 0.01 and 1% by weight, more preferably between 0.03 and 0.5% by weight, and further more preferably between 0.05 and 0.2% by weight, with respect to TPA.

For smooth proceeding of an esterification, it is also possible to add an intermediate at the beginning of the reaction. In the batch method, TPA and alkylene glycol as materials, or TPA, alkylene glycol, and 5 to 80% by weight of an intermediate with respect to TPA, are simultaneously supplied, so as to initiate the reaction. In the continuous polymerizetion method, at the beginning of polymerization, 5 to 80% by weight of an intermediate with respect to a certain level has previously been supplied to a reactor where the direct esterification will be carried out, and it is then melted. Thereafter, while a certain amount of a mixture consisting of TPA and alkylene glycol is charged into the reactor, a certain amount of reaction product is discharged, so as to initiate the reaction. Thereafter, the supply of materials and the discharge of a reaction product are continued, so as to transfer into a steady state.

The intermediate obtained by the above described method is subjected to a polycondensation reaction, so as to produce a prepolymer used in the present invention. The polycondensation reaction of a prepolymer is carried out by subjecting an intermediate to a polycondensation reaction under reduced pressure or in an atmosphere containing inert gas at a certain temperature, while eliminating alkylene glycol generated as a by-product.

A temperature at which a polycondensation reaction is carried out is preferably between 235 and 320° C. By setting the temperature at 235° C. or higher, solidification of a reaction product or extension of a reaction time can be prevented. By setting the temperature at 320° C. or lower, pyrolysis can be inhibited, so that a resin with excellent color tone can be produced. The temperature is more preferably between 240 and 310° C., and further more preferably between 245 and 300° C.

When a polycondensation reaction is carried out under reduced pressure, the degree of a reduced pressure is appropriately adjusted depending on the sublimation state of an intermediate or polycondensation reaction product, or a reaction rate. When a polycondensation reaction is carried out in an inert gas-containing atmosphere, in order to efficiently eliminate alkylene glycol generated as a by-product, it is preferable that a reaction system be substituted with inert gas at any time.

When an intermediate is subjected to a polycondensation reaction, a polycondensation reaction catalyst is preferably used. Use of such a polycondensation reaction catalyst enables significant reduction of a polycondensation reaction time. Previously known catalysts can be used as such polycondensation reaction catalysts. Examples of a preferred polycondensation reaction catalyst may include: germanium compounds such as germanium oxide; antimony compounds such as diantimony trioxide or antimony acetate; titanium alkoxides including titanium tetrabutoxide and titanium tetraisopropoxide as typical examples; titanium dioxide; and a double salt consisting of titanium dioxide and silicon dioxide. Of these, germanium oxide and diantimony trioxide are particularly preferable because these compounds bring on a rapid reaction rate and a good color tone. With regard to these catalysts, either only one type of catalyst may be used, or two or more types of catalysts may be used in combination. A polycondensation reaction catalyst is added to a prepolymer at a weight ratio preferably between 0.001 and 1% by weight, more preferably between 0.005 and 0.5% by weight, and particularly preferably between 0.01 and 0.2% by weight based on the weight of a prepolymer. When a compound acting also as a polycondensation reaction catalyst is used during the process of obtaining an intermediate, it is adequate to adjust so that the amount of catalysts falls within the above described range including the amount of the compound.

Examples of an apparatus for carrying out such a polycondensation reaction may include a vertical agitating polymerization reactor, a horizontal agitating reactor having a uniaxial or biaxial agitation blade, a natural falling thin-film polymerization reactor having trays, a thin-film polymerization reactor involving natural falling on a sloped plane, and a wetted-wall column. Furthermore, there may also be cases where these apparatuses may be used in combination.

With regard to a polycondensation reactor, in the batch polymerization method, a single apparatus may be used from initiation of the polycondensation reaction of an intermediate to achievement of a prepolymer. However, two or more reactors may also be used. In contrast, in the continuous polymerization method, in order to efficiently carry out the reaction, it is preferable that two or more reactors be used and that a temperature, a reduced pressure degree, and other factors be individually determined.

Next, a process of polymerizing the above PArT prepolymer in the polymerization reactor of the present invention will be described.

In the present invention, it is necessary that a PArT prepolymer that is in a molten state having an intrinsic viscosity $[\eta]$ between 0.2 and 2 dl/g should be supplied through a feed opening to a polymerization reactor, that the prepolymer should be discharged from holes of a perforated plate, and that the prepolymer should be polymerized under reduced pressure, while it is allowed to fall along the surface of a support that is open towards the outside at a temperature between the [crystalline melting point−10° C.] of the prepolymer or higher and the [crystalline melting point+30° C.] of the prepolymer or lower under the conditions represented by the following formula (1);

$$S_1/S_2 > 1 \tag{1}$$

wherein $S_1$: the surface area of falling polyalkylene terephthalate, and $S_2$: the area where the support is in contact with polyalkylene terephthalate.

The term "$S_1$: the surface area of falling polyalkylene terephthalate" in the above formula (1) means the mean surface area of a plane where PArT which falls along the surface of a support that is open towards the outside is in contact with a gas phase. For example, when PArT is allowed to fall along the surface of a wire-form support, $S_1$ is calculated from the mean radius of PArT falling around the wire in a cylindrical or conic form, which is obtained by defining the wire as a center. The above "mean radius of PArT obtained by defining the wire as a center" is obtained by filming the flow of a resin by a videocamera or the like through an observation hole equipped on the polymerization reactor and reading dimensions from several static images, so that the radius can be obtained as a mean value. Even when the flow of a resin has an irregular form, multiple static images are filmed, and the mean value of $S_1$ is calculated by image data processing, as described above. On the other hand, $S_2$ means the area where the support is in contact with polyalkylene terephthalate. When PArT wraps the support as a whole, $S_2$ is equal to the total surface area of the support. When PArT does not wrap the support as a whole, the support is removed from the polymerization reactor after termination of the experiment, the area to which PArT does not adhere is actually measured, and the measured value is subtracted from the total surface area of the support, so as to obtain the value of $S_2$.

In the present invention, it is important to prevent a prepolymer discharged from holes of a perforated plate from intensively foaming and being dispersed. By discharging the prepolymer having an intrinsic viscosity that is within the above described range at a temperature that is within the above described range, the scattering of the prepolymer due to intensive foaming can be prevented, and deterioration of the quality of the product due to contamination of the nozzle surface or wall of the polymerization reactor can be prevented. Moreover, surprisingly, the polymer falling along a support contains a large amount of bubbles, and a phenomenon whereby not only "the surface area of the polymer expands" but also "the polymer rolls down on the support in a form of bubble agglomerates or in a form of bubble balls" has been found. At the same time, a remarkable increase in the polymerization velocity and the improvement of the hue of the polymer have been confirmed. It is considered that such a remarkable increase in the polymerization velocity is caused by multiple actions such as a surface area expansion effect due to containment of a large amount of bubbles and a surface renewal effect due to the plasticizing action of the bubbles. Furthermore, the plasticizing action of the bubbles also enables the improvement of a polymer hue due to reduction of the residence time of the polymer in the polymerization reactor and the easy removal of a highly polymerized polymer with a high viscosity from the polymerization reactor.

The above Patent Documents 11 to 13 disclose polymerization reactors having structures similar to that of the present invention. However, the intrinsic viscosities of the prepolymers described in these documents are extremely low, and these intrinsic viscosities are less than 0.1 dl/g. Moreover, the polymerization temperatures disclosed therein are relatively high, and the temperatures are between 280 and 310° C. These conditions are determined to polymerize in a short residence time at a high temperature a prepolymer with a low polymerization degree, which is only slightly colored at the initial stage of reaction, so as to obtain a good-quality polymer with a high polymerization degree. According to the conventional technical knowledge, when a prepolymer with a higher polymerization degree is polymerized, coloration progresses at the time when it is a prepolymer, and further, a residence time increases when a prepolymer in a polymerization reactor is allowed to fall. Thus, the possibility of production of a high-quality polymer has never been conceived.

In contrast, as stated above, the range of the intrinsic viscosity of a prepolymer is set relatively high in the present invention, which is contrary to a technical knowledge in the art. Further, as described below, a polymerization temperature is set between the [crystalline melting point−10° C.] of the prepolymer or higher and the [crystalline melting point+30° C.] of the prepolymer or lower, which is lower than the conventional temperature in contradiction to a technical knowledge in the art. The present inventors have found that the foaming condition of a prepolymer can be controlled by determining the intrinsic viscosity of a prepolymer and the polymerization temperature within the aforementioned ranges. The inventors have found an unexpectedly excellent effect that a polymerization velocity can significantly be increased and a polymer with a high polymerization degree can easily be removed at such a low temperature. Thus, the inventors have succeeded in producing improved-quality PArT with a high polymerization degree.

In order to prevent the scattering of a prepolymer due to intensive foaming in the present invention, it is necessary to set the intrinsic viscosity [η] of the prepolymer at 0.2 dl/g or more. A prepolymer with an intrinsic viscosity [η] of 0.2 dl/g has a number average degree of polymerization of 25 and also has a melting viscosity at 280° C. of approximately 60 poises. Thus, the prepolymer is viscous. For the purpose of narrowing the molecular weight distribution of the obtained resin or of reducing the unevenness, it is desired that the intrinsic viscosity [η] of a prepolymer be high. On the other hand, in order to efficiently eliminate alkylene glycol generated as a by-product from the reaction system or to allow a prepolymer to fall while allowing it to foam to a moderate extent, it is desired that the intrinsic viscosity of a prepolymer be low, and the intrinsic viscosity [η] is preferably 2 dl/g or less. Thus, the intrinsic viscosity [η] of a prepolymer is more preferably between 0.25 and 1.5 dl/g, further more preferably between 0.3 and 1.2 dl/g, particularly preferably between 0.4 and 0.8 dl/g, more particularly preferably between 0.42 and 0.7 dl/g, and most preferably 0.44 and 0.6 dl/g.

Furthermore, while the scattering of a prepolymer due to intensive foaming is suppressed by an appropriate viscosity of the prepolymer, in order to allow the prepolymer to contain a large amount of bubbles or to prevent coloration due to pyrolysis, so as to obtain a high-quality PArT, it is preferable that the discharge temperature of the prepolymer be the [crystalline melting point+30° C.] of the prepolymer or lower. On the other hand, in order to uniformly discharge the prepolymer that is in a molten state from a perforated plate, and to allow the prepolymer that is in a uniform molten state containing a large amount of bubbles to fall along a support, it is preferable that the discharge temperature of the prepolymer be the [crystalline melting point−10° C.] of the prepolymer or higher.

Even if the composition of materials is the same when the materials are supplied, there are cases where different skeletons such as diethylene glycol generated as a by-product during polymerization may be incorporated into a polymer. Accordingly, there are some cases where the crystalline melting point of PArT may be changed depending on production conditions of a prepolymer, and thus, actual measurement of the crystalline melting point is necessary.

Herein, the crystalline melting point of a prepolymer means a peak temperature of an endothermic peak derived from melting of a crystal, when it is measured using Pyris 1 DSC (an input-compensating differential scanning calorimeter) manufactured by Perkin Elmer under the conditions indicated below. The peak temperature is determined using analysis software attached with the above instrument.

Measurement temperature: 0° C. to 300° C.
Temperature rising rate: 10° C./min.

The discharge temperature of a prepolymer is more preferably between the [crystalline melting point −5° C.] of the prepolymer or higher and the [crystalline melting point+25° C.] of the prepolymer or lower, more preferably between the crystalline melting point of the prepolymer or higher and the [crystalline melting point +20° C.] of the prepolymer or lower, further preferably between the crystalline melting point of the prepolymer or higher and the [crystalline melting point+15° C.] of the prepolymer or lower, most preferably between the crystalline melting point of the prepolymer or higher and the [crystalline melting point+10° C.] of the prepolymer or lower, and particularly most preferably between the crystalline melting point of the prepolymer or higher and the [crystalline melting point+5° C.] of the prepolymer or lower. In particular, in order to reduce the amount of impurities such as acetaldehyde, it is desired to discharge the prepolymer at a temperature as low as possible.

A perforated plate for discharging a prepolymer means a plate body having multiple holes. The thickness of such a perforated plate is not particularly limited, but it is usually between 0.1 and 300 mm, preferably between 1 and 200 mm, and more preferably between 5 and 150 mm. The perforated plate should bear the pressure of a molten prepolymer-supplying chamber. When a support in a polymerization chamber is fixed to the perforated plate, the plate should have a strength which is necessary for supporting the weight of the support and the weight of a falling molten prepolymer. It is therefore preferable that the perforated plate be stiffened by ribs or the like. A hole on the perforated plate has a form selected from the group consisting of a circle, an ellipse, a triangle, a slit, a polygon, and a star. The cross section of a hole is usually between 0.01 and 100 cm$^2$, preferably between 0.05 and 10 cm$^2$, and particularly preferably between 0.1 and 5 cm$^2$. In addition, the hole may comprise a nozzle connecting thereto. The space between two holes, which corresponds to the distance between the center of a hole and the center of another hole, is usually between 1 and 500 mm, and preferably between 10 and 100 mm. A hole on the perforated plate may be a through hole passing through the plate, or it may be a case where a tube is equipped on the perforated plate. Otherwise, the hole may be in a tapered form. It is preferable to determine the size or form of a hole, such that a pressure loss is between 0.1 and 50 kg/cm$^2$ when a molten prepolymer passes through the perforated plate. The material of the perforated plate is preferably metal such as stainless steel, carbon steel, hastelloy, nickel, titanium, chrome, and other types of alloys.

A filter is preferably established in a prepolymer pass located upstream of the perforated plate. Such a filter can eliminate foreign substances, which block holes on the perforated plate. The type of a filter is appropriately selected, such that the filter can eliminate a foreign substance which is greater than the diameter of each hole on the perforated plate, and that it is not damaged by passage of a prepolymer.

Examples of a method of discharging a prepolymer through the above described perforated plate may include a method of allowing a prepolymer to fall due to liquid head or its own weight, and a method of applying pressure to a prepolymer and extruding it using a pump or the like. In order to suppress a fluctuation in the amount of a falling prepolymer, it is preferable to extrude the prepolymer using a pump having measuring ability, such as a gear pump.

The number of holes on a perforated plate is not particularly limited, and it is different depending on conditions such as a reaction temperature or pressure, the amount of a catalyst, and the range of the molecular weight to be polymerized. When a polymer is produced at a rate of 100 kg/hr for example, the necessary number of holes is usually between 10 and 10$^5$, more preferably between 50 and 10$^4$, and further preferably between 10$^2$ and 10$^3$.

By using a perforated plate, the drift of a prepolymer can be suppressed, and the local retention of the prepolymer in a reactor can also be prevented, so as to produce a high-quality homogenous PArT.

A prepolymer discharged from holes of a perforated plate should be polymerized under reduced pressure, while it is allowed to fall along the surface of a support that is open towards the outside under the conditions represented by the following formula (1):

$$S_1/S_2 > 1 \quad (1)$$

wherein $S_1$: the surface area of falling polyalkylene terephthalate, and $S_2$: the area where the support is in contact with polyalkylene terephthalate.

During this process, a falling prepolymer preferably has a foaming portion to such an extent that generated bubbles do not burst in a moment. More preferably, a lower portion of a prepolymer falling along a support foams. Most preferably, a prepolymer containing a large amount of bubbles is converted to a form of bubble agglomerates or in a form of bubble balls, and it rolls down on the support. The term "foam" is used herein to mean both a state where bubbles burst and disappear in a moment, and a state where bubbles are maintained.

As represented by the above formula (1), a relationship $S_1/S_2 > 1$ should hold in the present invention (that is, in other words, a relationship $S_1/S_2 \leq 1$ does not hold). In the case of a known wetted-wall polymerization reactor for example, a relationship $S_1/S_2 < 1$ holds. However, if the value of $S_1$ is increased to promote a polycondensation reaction, the value of $S_2$ is also increased logically, consequently the falling of a prepolymer becomes then difficult. As a result, surface renewal occurring with the falling of the prepolymer is insufficient, and the foaming of the prepolymer during the falling hardly occurs. Thus, when compared with the present invention, an improvement of a polymerization velocity or elimination of impurities such as acetaldehyde is insufficient. Further, a drift of the prepolymer is likely to occur when it falls, and thus, it is difficult to obtain homogenous PArT. When PArT with a high polymerization degree is obtained, such a tendency is increasingly observed. In contrast, when the surface renewal properties are improved by facilitating the falling of a prepolymer, the thickness of a film must be thickened. As a result, the value of $S_1$ becomes small, and thus, when compared with the present invention, an improvement of a polymerization velocity or elimination of impurities such as acetaldehyde is insufficient.

On the contrary, the present invention is characterized in that a support such as a wire is used to set $S_1/S_2$ at a value greater than 1. The value of $S_1/S_2$ can arbitrarily be adjusted depending on the form of a support or the amount of a prepolymer supplied. The value of $S_1/S_2$ is more preferably 1.5 or greater, more preferably 2 or greater, particularly preferably 3 or greater, most preferably 4 or greater, and particularly most preferably 5 or greater. Differing from the case of a wetted-wall polymerization reactor, both an effect of expanding a surface area obtained by increasing the value of $S_1$, and an effect of increasing surface renewal properties occurring with falling of a prepolymer that is obtained by decreasing the value of $S_2$, can be obtained at the same time. Accordingly, a polymerization velocity or elimination of impurities such as acetaldehyde is significantly improved. Moreover, a phenomenon such as a drift occurring during the falling of a prepolymer can also be prevented, and thus, high-quality PArT with a high polymerization degree can be produced.

Examples of a specific structure of a support may include a wire form, a chain or lattice (wire gauze) form obtained by combining wire-form materials, a space lattice form obtained by connecting wire-form materials so as to form what is called jungle gym, a flat or curved thin plate form, a perforated plate form, and a packed tower form obtained by cumulating regular or irregular packing bodies. The surfaces of these supports are "open towards the outside." (That is to say, PArT is polymerized while it is allowed to fall along the outer surface of a support.) In contrast, in the case such as a wetted-wall column whereby PArT is polymerized while it is allowed to fall along the inner surface of a cylinder whose length is 3.14 times or more of an inside diameter thereof, the surface of a support is defined as being "closed towards the inside." When the surface of a support is "closed towards the inside," the surface area of a falling resin cannot sufficiently be increased, and alkylene glycol generated as a by-product or impurities such as acetaldehyde cannot efficiently be eliminated. Thus, it is difficult to produce high-quality PArT with good productivity.

In order to efficiently remove alkylene glycol coproduct or acetaldehyde, the surface area of a falling resin is preferably increased. In addition to a larger surface area of the falling resin, in order to more efficiently remove the above compounds, it is preferable that a prepolymer be allowed to fall along a support having asperities in the direction where the prepolymer falls, thereby actively causing agitation and surface renewal. Accordingly, a support having a structure that impedes the falling of a resin, such as a chain form, a space lattice form, or a wire form having asperities against the direction where the resin falls, is also preferable. It is also preferable that these supports be used in combination.

The term "wire form" means a material having an extremely great ratio between a mean length of the outer circumference of a cross section and the length in a direction which is vertical to the cross section. The area of the cross section is not particularly limited, but it is usually between $10^{-3}$ and $10^2$ cm$^2$, preferably between $10^{-3}$ and $10^1$ cm$^2$, and particularly preferably between $10^{-2}$ and 1 cm$^2$. The form of the cross section is not particularly limited, but it is usually selected from the group consisting of a circle, an ellipse, a triangle, a quadrangle, a polygon, and a star. The form of the cross section includes either one that is identical in a length direction, or one that is different in a length direction. In addition, the above wire includes a hollow wire. Herein, the wire includes a single wire such as a piece of wire and a combined wire obtained by twining multiple wires. Examples of the surface of a wire may include a smooth surface, an uneven surface, and a surface partially having projections. The material of a wire is not particularly limited, but it is usually selected from the group consisting of stainless steel, carbon steel, hastelloy, and titanium. Moreover, such a wire may be subjected to various types of surface treatments, as necessary, such as plating, lining, a passivation treatment, or acid washing.

The term "lattice form (wire gauze form)" means a material formed by combining the above described wire form materials to make a lattice form. Wires to be combined may include both a linear wire and a curved wire. The combination angle can arbitrarily be selected. When a lattice-form (wire gauze-form) material is projected from a vertical direction against the plane, the area ratio between the material and a space is not particularly limited. However, the area ratio is usually between 1:0.5 and 1:1,000, preferably between 1:1 and 1:500, and particularly preferably between 1:5 and 1:100. The area ratio is preferably equal in a horizontal direction. In a vertical direction, it is preferable that the area proportion be equal or that the proportion of a space be increased at a bottom portion.

The term "chain form" means a material obtained by connecting rings made from the above described wire-form materials. Examples of the form of a ring may be a circle, an ellipse, a rectangle, and a square. The connection manner may include all of one-dimensional, two-dimensional, and three-dimensional.

The term "space lattice form" means a material obtained by three-dimensionally combining wire-form materials to make a space lattice like what is called a jungle gym. Wires to be combined may include both a linear wire and a curved wire. The combination angle can arbitrarily be selected.

The term "wire form having asperities in the direction where a polymer falls" means a material obtained by squarely attaching bars with a circular or polygonal section to a wire, or a material obtained by attaching disks or cylinders to a wire. The step between the resulting recess and protrusion is preferably 5 mm or greater. A specific example may be a disk-attached wire, wherein a wire passes through the center of disks having a diameter, which is 5 mm or more greater but is 100 mm or smaller than the diameter of the wire, and having a thickness between 1 and 50 mm, and wherein the interval between disks is between 1 and 500 mm.

In the case of a chain-form support, a space lattice-form support, and a wire-form support having asperities in a vertical direction to the direction where a polymer falls, the volume ratio between the volume of a support to be combined and a space is not particularly limited. However, the volume ratio is usually between 1:0.5 and 1:10$^7$, preferably between 1:10 and 1:10$^6$, and particularly preferably between 1:50 and 1:10$^5$. The volume ratio is preferably equal in a horizontal direction. In a vertical direction, it is preferable that the volume ratio be equal or that the proportion of a space be increased at a bottom portion.

A single support may be established, or multiple supports may be established. It can be selected as appropriate depending on the form of the support. In the case of a wire-form support or linearly connected chain-form support, the number of supports is usually between 1 and 10$^5$, and preferably between 3 and 10$^4$. In the case of a lattice-form, two-dimensionally connected chain-form, thin plate-form, or perforated plate-form support, the number is usually between 1 and 10$^4$, and preferably between 2 and 10$^3$. In the case of a three dimensionally connected chain-form, space lattice-form, or packed tower-form support, it can appropriately be selected whether a single support is used or a support is divided to use multiple supports, depending on the size of the apparatus or a space where the apparatus is installed.

When multiple supports are used, it is preferable to use a spacer as appropriate, so that the supports do not come into contact with one another.

In the present invention, to a single support, a prepolymer is usually supplied from one or more holes on a perforated plate. However, the number of holes can appropriately be selected depending on the form of a support. In addition, it is also possible that a prepolymer passing through a hole is allowed to fall along multiple supports. In order to keep a uniform falling state to obtain a polymer with a small degree of unevenness, the number of supports along which the polymer is allowed to fall is preferably small. Most preferably, a prepolymer is supplied from a single hole to a single support that is located in a direction where the polymer falls. The position of such a support is not particularly limited, as long as it is a position onto which the prepolymer can fall along the support. A method of attaching a support to a perforated plate can be appropriately selected from a case where the support is disposed by passing through holes on the perforated plate and a case where the support is disposed at the bottom portions of holes on the perforated plate without passing through the holes.

A vertical distance by which a prepolymer having passed through a hole is allowed to fall, is preferably between 0.5 and 50 m, more preferably between 1 and 20 m, and further preferably 2 and 10 m.

The flow rate of a prepolymer passing through holes on a perforated plate is preferably between $10^{-2}$ and $10^2$ L/hr per hole, and particularly preferably 0.1 and 50 L/hr per hole. By setting the flow rate within the above range, a significantly slow polymerization velocity or significantly low productivity can be prevented.

An average time required to allow a prepolymer to fall along a support is preferably between 10 seconds and 100 hours, more preferably between 1 minute and 10 hours, further preferably between 5 minutes and 5 hours, and particularly preferably between 20 minutes and 3 hours.

In the present invention, polymerization performed while allowing a prepolymer to fall along a support should be carried out under reduced pressure. This is because alkylene glycol generated as a by-product as a result of proceeding of the reaction is efficiently eliminated from the reaction system, so as to promote polymerization. The term "reduced pressure" means that a pressure is lower than the atmospheric pressure, and in general, such a reduced pressure is preferably 50,000 Pa or less, preferably 10,000 Pa or less, further preferably 1,000 Pa or less, and particularly preferably 100 Pa or less. The lower limit is not particularly limited, but it is preferably 0.1 Pa or more in view of the scale of equipment for keeping the reaction system under reduced pressure.

Moreover, it is also preferable to introduce a small amount of inert gas, which does not affect the reaction, under reduced pressure, so as to eliminate alkylene glycol co-product, acetaldehyde, or the like, together with the inert gas.

It has conventionally been understood that inert gas is introduced into a polymerization reactor to decrease the partial pressure caused by-products generated as a result of a polycondensation reaction and to shift equilibration, so as to advantageously promote the reaction. In the present invention, however, the amount of inert gas to be introduced can be extremely small, and thus, it is hardly expected to increase a polymerization velocity by partial pressure-decreasing effects. Thus, the role of inert gas in the present invention cannot be explained based on the conventional knowledge. According to the studies of the present inventors, surprisingly, introduction of inert gas into a polymerization reactor causes a phenomenon wherein a molten prepolymer intensively foams on a support. By this phenomenon, the surface area of the molten prepolymer is significantly expanded, and the surface renewal state thereof becomes extremely good. The principle is uncertain, but it is assumed that a change in the inside of the molten resin and in the surface state thereof causes a significant increase in a polymerization velocity.

Gas that does not affect a resin adversely due to coloration, denaturation, or decomposition, is suitable as inert gas to be introduced. Such inert gas includes nitrogen, argon, helium, carbon dioxide, lower hydrocarbon gas, and a mixed gas thereof. As such inert gas, nitrogen, argon, helium, and carbon dioxide are more preferable, and of these, nitrogen is particularly preferably in terms of easy procurement.

The amount of inert gas introduced in the present invention may be extremely small. It is preferably between 0.05 and 100 mg per g of resin taken from a polymerization reactor. When the amount of inert gas is set at 0.05 mg or more per g of resin taken from the polymerization reactor, the resin sufficiently foams, so that the effect of enhancing a polymerization degree increases. In contrast, when the amount of inert gas is set at 100 mg or less, a degree of reduced pressure easily increases. The amount of inert gas is more preferably between 0.1 and 50 mg, and particularly preferably between 0.2 and 10 mg, per g of resin taken from a polymerization reactor.

Examples of a method of introducing inert gas may include: a method of directly introducing inert gas into a polymerization reactor; a method of previously allowing inert gas to be absorbed to and/or contained in a prepolymer, and releasing the absorbed and/or contained gas from the prepolymer under reduced pressure, so as to introduce it into a polymerization reactor; and a method of using these methods in combination.

The term "absorb" is used herein to mean that inert gas is dissolved in a resin and does not exist as an air bubble. The term "contain" is used herein to mean that inert gas exists as an air bubble. When inert gas exists as an air bubble, the smaller the size of the air bubble, the better. The average bubble diameter is preferably 5 mm or less, and more preferably 2 mm or less.

When inert gas is directly introduced into a polymerization reactor, it is preferably introduced into a position, which is far from a dispersion plate and close to a discharge port of resin. In addition, the position is preferably apart from an evacuation line.

Examples of the above method of previously allowing inert gas to be absorbed to and/or contained in a prepolymer may include: methods of using known absorption devices such as a packed tower-type absorption device, a plate-type absorption device, and a spray tower-type absorption device, described in *Kagaku Sochi Sekkei/Sosa Series No. 2, Kaitei Gasu* Kyushu pp. 49-54 (Mar. 15, 1981, published by Kagaku Kogyo Co., Ltd.); and a method of pressing inert gas into a tube to which a prepolymer is transported. A method of using a device for absorbing inert gas while allowing a prepolymer to fall along a support in an inert gas-containing atmosphere is most preferable. In this method, inert gas having a pressure higher than that in a polymerization reactor is introduced into a device for absorbing the inert gas. In this method, the pressure is preferably between 0.01 and 1 MPa, more preferably between 0.05 and 0.5 MPa, and further preferably between 0.1 and 0.2 Pa.

When a prepolymer is allowed to fall along a support, the temperature of the atmosphere is within a range between the [crystalline melting point−10° C.] or higher and the [crystalline melting point+30° C.] or lower. It is more preferably between the [crystalline melting point−5° C.] or higher and the [crystalline melting point+25° C.] or lower, further preferably between the crystalline melting point or higher and the [crystalline melting point+20° C.] or lower, further more preferably between the crystalline melting point or higher and the [crystalline melting point+15° C.] or lower, most preferably between the crystalline melting point or higher and the [crystalline melting point+10° C.] or lower, and particularly most preferably between the crystalline melting point or higher and the [crystalline melting point+5° C.] or lower.

By setting the temperature of the atmosphere during polymerization at the [crystalline melting point −10° C.] or higher, it becomes easy to allow a polymer to stably fall in a state where it contains a large amount of bubbles, such that the polymer is not solidified while it falls. In contrast, by setting the temperature of the atmosphere during polymerization at the [crystalline melting point+30° C.] or lower, coloration due to pyrolysis is prevented, a state where the polymer contains a large amount of bubbles is maintained, thereby easily obtaining high-quality PArT. It is preferable that a temperature applied when a polymer is allowed to fall be within the above temperature range and that the difference between the above temperature and the temperature of the polymer discharged from a perforated plate be 20° C. or less. The difference is more preferably 10° C. or less, and particularly preferably 5° C. or less. The above temperature is most preferably the same as the discharge temperature of the polymer. Such a temperature can be achieved by appropriately adjusting the temperature of a heater or jacket disposed on the wall of a polymerization reactor covering a support, or by placing a heater or heat medium in the support to appropriately adjust the temperature of the support.

In the present invention, when PArT is produced which has a high polymerization degree suitable for the production of a drinking water container and has a low content of volatile impurities such as acetaldehyde, a prepolymer has preferably a high intrinsic viscosity [η] of not less than 0.41 dl/g and also a low carboxyl end group concentration of 150 meq/kg. Such intrinsic viscosity [η] allows preferable prepolymer falling velocity and foaming condition, thereby dramatically increasing polymerization velocity. The intrinsic viscosity [η] of the prepolymer is more preferably not less than 0.42 dl/g, and most preferably 0.44 dl/g. In contrast, the carboxyl end group concentration of not greater than 150 meq/kg increases polymerization velocity, thereby achieving high polymerization degree and inhibiting its discoloration. The carboxyl end group concentration is more preferably not greater than 100 meq/kg, further preferably not greater than 80 meq/kg, and particularly preferably not greater than 50 meq/kg.

The prepolymer that has a high intrinsic viscosity [η] and is suitable for the production of high quality resin with a high polymerization degree is preferably produced by a method employing a horizontal agitating polymerization reactor having uniaxial or biaxial agitating blade with a larger surface area and a high surface renewal efficiency.

According to the present invention, PArT prepolymers in a molten state are continuously fed into a polymerization reactor through a feed opening, and polymerized while being allowed to fall along a support from holes of a perforated plate. Then, a method for continuously withdrawing all the fallen resin from the polymerization reactor, a method for circulating a part of the fallen polymers and again allowing the polymers to fall along the support for polymerization or other methods may be employed. The method for withdrawing all the fallen resin is more preferable. When the polymers are circulated and polymerized while again falling along the support, it is preferable to shorten residence time and reduce temperature of the polymers in a liquid receiver, a circulation line or the like to inhibit thermal decomposition in these places after falling along the support.

Once the polymerized PArT is pelletized, it can be re-melted for molding. In addition, according to a method for transferring the PArT in a molten state to a molding machine for molding thereof, a molded product with much higher quality can be produced at a low cost.

When the PArT is pelletized, it is desirably extrudable in a uniform manner with an extruder with a reduced loss. To obtain such pellets, it is preferred that molten PArT is extruded in a strand or sheet shape, quickly placed into a coolant such as water for cooling, and thereafter cut. The temperature of the coolant is not higher than 60° C., more preferably not higher than 50° C., and further preferably not greater than 40° C. As the coolant, water is preferable taking economical efficiency and handling property into consideration. Thus, it is preferable that the temperature of the coolant not be greater than 0° C. Cutting for pelletization is preferably carried out after the resin is cooled down to not greater than 100° C. within 120 seconds from extrusion.

When the polymerized PArT is transferred in a molten state to a molding machine and molded, a prepolymer composed of 70 mol % or more of alkylene terephthalate repeating units while in a molten state is fed into a polymerization reactor and polymerized under reduced pressure while being allowed to fall along an outer surface of a support. Then, it is important that the molten PArT withdrawn from the polymerization reactor is transferred to a molding machine and molded while maintaining its quality by preventing polymerization degree reduction, coloration, or the generation of volatile impurities due to thermal decomposition until molding.

It should be noted that the PArT is PArT composed of 70 mol % or more of repeating units of ethylene terephthalate, trimethylene terephthalate, or 1,4-butylene terephthalate. The PArT includes one containing 30 mol % or less of one or more kinds of other copolymerizing components.

PArT produced by solid phase polymerization while melt processing is easily brought into an intensive condition such as high temperature heating or shearing heat generation, and thus there was a problem in that its quality was remarkably deteriorated. On the other hand, a PArT molded article produced by polymerization method and molding method of the present invention is less deteriorated in quality before and after melt processing compared with a PArT molded article produced by solid phase polymerization. One of the factors to be considered is the physical state of the resin when it is fed into a melt processing apparatus. Other factors are considered as follows. The solid phase polymerization technique requires a long polymerization time like several tens of hours, though temperature not higher than the melting point is applied, and rise-and-fall of temperature repeated many times. Further, pellets are affected by moisture absorption, oxidative deterioration and the like. In comparison, the polymerization method of the present invention usually completes the polymerization within three hours at a temperature near the melting point of PArT, and it is further considered that no rotary driving part or resin pool in a main body of the polymerization apparatus results in almost no occurrence of air leak entry, cutting of molecular chains caused by shearing, and resin deterioration caused by melt accumulation. Furthermore, when the PArT is fed into a melt processing apparatus, it considered that the PArT is not affected by moisture absorption and oxidation deterioration. According to the present invention, solid phase polymerization technique is not necessary in the case of producing PArT, so that complicated processes specific to solid phase polymerization and energy can be reduced.

In order to transfer the PArT polymerized by the inventive polymerization method in a molten state to a molding machine, it is necessary to transfer the melt from the polymerization reactor to the molding machine for melt molding in a time as short and at a temperature as low as possible, but not to solidify the molten resin withdrawn from the polymerization reactor. The molten state herein represents a state wherein the resin is melted and flowed by heating, and has a viscosity of not greater than about 500,000 Pa·s.

As long as the temperature for transferring the polymerized PArT to the molding machine and molding is not less than [crystalline melting point minus 10° C.], stable transfer and molding can be carried out without remarkably high viscosity or solidification. On the other hand, the temperature of not greater than [crystalline melting point plus 60° C.] prevents the coloration caused by thermal decomposition or the generation of volatile impurities, and high quality PArT molded articles can be produced. The temperature of the PArT is preferably [crystalline melting point plus 0 to 40° C.], more preferably [crystalline melting point plus 0 to 30° C.], further preferably [crystalline melting point plus 0 to 20° C.] and particularly preferably [crystalline melting point plus 1 to 15° C.]. Such temperature can be achieved by properly controlling temperatures of a transfer piping and a transfer pump, a heater or a jacket covering the molding machine.

Further, the time required until molding is preferably not higher than 40 minutes, more preferably not higher than 20 minutes, and most preferably not higher than 10 minutes. It is certainly better as the time is shorter. Here the time required until molding means a time during which the molten resin is withdrawn from a drainage pump of the polymerization reactor, discharged inside or from the molding machine, and cooled down to not higher than crystalline melting point of the resin. In the case of continuous transfer within a piping or the like, an average time calculated based on a volume of the piping or the like and a flow rate can be used. In addition, when this time is varied, it is necessary to adjust it within the above-mentioned time periods.

In the present invention, a uniaxial or biaxial kneading machine, static mixer or the like is installed between the polymerization reactor and the molding machine as long as the above-mentioned temperature and time ranges are maintained, and as required, an additive such as a stabilizer, a nucleator, and a pigment may be added to the resin.

In the present invention, various additives may be copolymerized or mixed, if necessary. Examples thereof include delustering agents, thermostabilizers, flame retardants, antistatic agents, antifoaming agents, orthochromatic agents, antioxidants, ultraviolet absorbers, crystal nucleators, brightening agents, and scavengers for impurities. These additives can be added at any stage.

In particular, the addition of a stabilizer is preferable in the present invention, and pentavalent and/or trivalent phosphorus compounds or hidered phenol compounds are preferable. The phosphorus compound used has a phosphorus weight equivalent of preferably 2 to 500 ppm based on the weight of PArT, and more preferably 10 to 200 ppm. Specific examples of the compounds include preferably trimethylphosphite, phosphoric acid, and phosphorus acid. The phosphorus compound inhibits coloration of PArT resin, and at the same time preferably has an effect as a crystal nucleator. The hindered phenol compound is a phenol derivative having a substituent which has steric hindrance at a position adjacent to a phenol hydroxyl group, and the compound has one or more ester linkage in its molecule. The load of the hindered phenol compound is set so that the hindered phenol compound has a weight ratio of preferably 0.001 to 1% by weight and more preferably 0.01 to 0.2% by weight based on the obtained PArT. Examples of the compounds include pentaerythritol tetrakis(3-(3,5-di-tert-butyl-4-hydroxyphenyl)propionate), 1,1,3-tris(2-methyl-4-hydroxy-5-tert-butylphenyl)butane, octadecyl-3-(3,5-di-tert-butyl-4-hydroxyphenyl)propionate, and N,N'-hexamethylene bis(3,5-tert-butyl-4-hydroxyhydrocinnamamide). The use of these stabilizers is one of preferable methods.

These stabilizers can be added at any stage up to molding. However, it is preferable that the phosphorus compound be added at an early phase of polycondensation reaction and the hindered phenol compound is added at an early phase of polycondensation reaction or after withdrawal from a polymerization reactor.

Further, a crystal nucleator is preferably added in the present invention, and as the crystal nucleator a phosphorus compound, an organic acid metal salt, PArT, and powder of other resins are preferable. The load of the crystal nucleator in PArT is preferably 2 to 1,000 ppm, more preferably 10 to 500 ppm. Specific examples thereof include phosphates such as 2,2'-methylene bis(4,6-di-t-butylphenyl)sodium phosphate and bis(4-t-butylphenyl)sodium phosphate, sorbitol such as bis(p-methylbenzylidene)sorbitol, and metal element-containing compounds such as bis(4-t-butylbenzoic acid)hydroxyaluminum. In particular, the crystal nucleator is preferably used for a bottle preform, a mouth part of which is thermally crystallized by heating, with the purpose of promoting crystallization and reducing thermal crystallization temperature.

Furthermore, the addition of a scavenger of a volatile impurity with a low molecular weight is one of preferable methods in the present invention. As the scavenger, polymers or oligomers of polyamides or polyesteramides, and low molecular-weight compounds such as 2-aminobenzamide having an amide group or amine group may be used. Specific examples thereof include polymers such as polyamides such as nylon 6.6, nylon 6 and nylon 4.6, and polyethyleneimine and also a reaction product of N-phenylbenzenamine and 2,4,4-trimethylpentene, and Irganox 1098®, Irganox 565® available from Chiba Speciality Chemicals Co. The scavenger is preferably added after the PArT is withdrawn from the polymerization reactor and before it is fed to a molding machine.

Examples of the molded articles produced by the above method include a preform for hollow body molding, a hollow body, a film, a sheet, fiber, a strand, and a pellet. These articles can be molded with one molding machine; articles of the same type can be molded simultaneously with two or more molding machines; or articles of plural types can be molded simultaneously with two or more types of molding machines.

As one exemplary molded article, one of the following molding methods (a) to (d) is preferably selected in molding a hollow body. Here, a hollow body is a molded article having a space inside a resin molded article, and a blow bottle is one of examples therefor. A molding machine or an extruder for molding a preform may be independent from a blow molding machine for molding a hollow body. A molding machine which can mold a hollow body from resin through a preform inside itself is also preferable since the number of heating processes is small. Further, when the process is combined with aseptic filling which is conducted in a sterile room up to content filling after blow-molding, a high-temperature pasteurization process is not necessary, which is further preferable. In any molding method, biaxial orientation is preferably carried out during blow molding in the light of imparting impact resistance to the bottle. One to three times of lengthwise stretching is suitable. In the molding machine, the resin has a temperature of preferably 230° C. to 330° C. and more preferably 240° C. to 320° C.

(a) The resin in a molten state is transferred from the polymerization reactor to a molding machine for molding a preform. The preform is completely solidified and taken out, and the obtained preform is melt by heating and blow-molded in a metal mold to obtain a hollow body (cold parison method). During blow-molding, it is preferable to apply lengthwise stretching on a bottle in the light of imparting impact resistance to the bottle. External heating on the preform is preferably employed in re-melting process.

Meanwhile, the preform is taken out when only its surface is solidified. Then, the entire preform is re-melt by the dispersion of the internally-stored heat quantity and blow-molded, thereby obtaining a hollow body. This method is also preferably used (hot parison method). Lengthwise stretching on a bottle during blow-up process is further preferably employed.

(b) The resin in a molten state is transferred from the polymerization reactor to a molding machine for molding a preform. The preform in a molten state is taken out and blow-molding is carried out in a metal mold to obtain a hollow body. During blow-molding lengthwise stretching on a bottle is also preferably employed.

(c) The resin is once pelletized to obtain a pellet, and the pellet is transferred to a molding machine. Subsequently, the same method as described (a) is employed to obtain a molded article. During blow-molding, lengthwise stretching on a bottle is preferably employed.

(d) The resin is once pelletized to obtain a pellet, and the pellet is transferred to a molding machine. Subsequently, the same method as described (b) is employed to obtain a molded article. During blow-molding, lengthwise stretching on a bottle is preferably employed.

The number of molding machines and/or extruders to be connected to the polymerization reactor is either one or two or more, and the resin may be fed to a plurality of them. Due to intermittent operation of a molding machine, when a plurality of molding machines are used, a method wherein molding cycles of the plurality of molding machines are delayed at constant interval and thereby the flow rate is averaged is preferably employed so that the resin withdrawn from the polymerization reactor does not stay in a piping connecting between the polymerization reactor and the molding machine for a long time but keep a constant flow rate.

Further, when the resin continuously withdrawn from the polymerization reactor is introduced to an intermittently operating molding machine, it is preferable to install an accumulator for accumulating the molten resin on the way. It is more preferable that the molding machine be synchronized with the accumulator so as to reduce the accumulation of the molten resin.

Furthermore, a method is preferably employed wherein an extruder is provided independently from a molding machine and pelletization is carried out at the same time of molding.

A commercially available pellet molding machine can be used with no modification or with modification. In particular, according to the present invention, the molten PArT is fed directly from the polymerization reactor, and thus a pellet plasticating mechanism such as a melt plasticating screw, which has been essential for a conventional pellet molding machine, can be simplified or omitted. As a result, molding can be carried out under a condition with small shearing heat generation due to the plasticating mechanism, and thereby further high quality PArT molded articles can be produced.

In the case of a beverage use bottle, volatile substances or leachable substances contained in resin are eluted into a beverage, and they adversely affect the taste or smell of the beverage. In PET polymerization, particularly a decomposable component, acetaldehyde, even a small amount thereof, causes uncomfortable feeling to human taste and sense of smell and hence the decrease of its content is desired.

The PArT polymerization method and molding method of the present invention have a smaller number of times of heating of resin compared with solid phase polymerization, and a lower molding temperature can be employed, so that the generation amount of acetaldehyde etc. is small. Further, during polymerization, volatile impurities in the resin are effectively emitted due to resin surface renewal and bubble generation, and thereby the content thereof can be reduced. Furthermore, the present invention has smaller thermal hysteresis. When continuous extrusion is employed, coloration can be kept at a lower level since there is no chance that the surface of the molten resin is exposed to air.

A PET resin of the present invention suitable for producing a beverage use bottle is polyethylene terephthalate comprising by not less than 70 mol % of ethylene terephthalate repeating units, characterized in that it has the following characteristics (C) to (F):

(C) having an intrinsic viscosity [η] ranging between 0.5 and 2.0 dl/g;

(D) having a molecular weight distribution represented by Mw/Mn ranging between 1.8 and 2.2;

(E) having an L-value and a b-value, which are obtained by measuring optical transmission of a solution prepared by dissolving the polyethylene terephthalate in HFIP at a concentration of 13% by weight, ranging between 99 and 100, and between −0.5 and 0.5, respectively;

(F) having the content of acetaldehyde at 10 ppm or less.

The above PET resin has been produced for the first time by the following method. The above-mentioned prepolymer of polyethylene terephthalate with an intrinsic viscosity [η] of 0.2 to 2 dl/g is fed into a polymerization reactor through a feed opening while in a molten state, and ejected from holes of a perforated plate. Thereafter, the prepolymer is allowed to fall along the surface of a support that is open towards the outside at a temperature between [crystalline melting point−10° C.] of the prepolymer or higher and the [crystalline melting point+30° C.] of the prepolymer or lower for polymerization under reduced pressure. By this method, the PET resin can be produced in the most easy and industrially stable manner.

The PET resin may contain one or more kinds of other copolymerizing components at not higher than 30 mol %. Examples of the copolymerizing components include ester-forming monomers such as sodium 5-sulfoisophthalate, 3,5-dicarboxylic acid benzenesulfonic acid tetramethyl phosphonium salts, 1,4-cyclohexanedicarboxylic acid, 2,6-naphthalenedicarboxylic acid, p-phenylene dicarboxylic acid, p-hydroxybenzoic acid, 6-hydroxy-2-naphthalene carboxylic acid, 1,3-butanediol, 1,4-butanediol, neophentyl glycol, 1,6-hexamethylene glycol, 1,4-cyclohexanediol, 1,4-cyclohexanedimethanol, isophathalic acid, o-phthalic acid, trimellitic acid, pyromellitic acid, oxalic acid, succinic acid, adipic acid, dodecanedioic acid, fumaric acid, maleic acid, and 1,4-cyclohexanedicarboxylic acid, polyethylene glycols, polypropylene glycols, polytetramethylene glycols, and copolymers thereof. In addition to PET, the PET resin of the present invention may contain a cyclic or linear oligomer, a monomer of DMT, TPA, and EG, and various additives.

With respect to an intrinsic viscosity [η] of (C) above, the range thereof is preferably from 0.6 to 1.5 dl/g, and more preferably from 0.7 to 1.3 dl/g for the purpose of producing a hollow body.

With respect to a molecular weight distribution of (D) above represented by Mw/Mn, the distribution is important to control the quality of melt-processed products, and the range thereof in the present invention is from 1.8 to 2.2, and preferably 1.8 to 2.1.

In solid phase polymerization, molten prepolymer is pelletized for crystallization, and heated at a temperature lower than its melting point to increase its molecular weight. Compared with the surface part of the pellet, it is rather difficult to release coproduced alkylene glycol from the central part of the pellet, and thus the surface part of the pellet tends to have a larger molecular weight than the central part, resulting in a non-uniform reaction providing a broader molecular weight distribution. Further, along with solid phase polymerization, a large amount of fine powder is generated, and in a subsequent solid phase polymerization, the fine powder part with high specific surface area is preferentially turned to have a large molecular weight. This is a cause for a further broadening molecular weight distribution.

PArT resin produced by this solid phase polymerization has a partial resin such as the surface layer part of the pellet so that it has locally a large molecular weight immediately after the production.

During melt processing, high molecular weight polymer localized in the surface part of pellets is prone to undergo hydrolysis and/or transesterification to a different degree depending on conditions under which the pellets are stored and dried before melt processing as well as melt-processed, such as melt temperature. As a result, it has been an undesirable problem that a polymerization degree of the pellet immediately after the production, and a polymerization degree of the resin during melt processing and in the melt-processed product fluctuate easily and hence it is hard to control the quality of the melt-processed product.

In addition, the powder component and the surface part of pellets may give rise not only to a broader molecular distribution but also to insufficient melting in melt processing due to high molecular weight and high crystallinity. To prevent such a situation, the resin must be melt-processed at a higher temperature to avoid contamination with the unmelted resin, and also at a high shear. What is worse, when the resin containing the powder and the surface part of pellets that are difficult to melt is sheared under friction, the molten resin is heated to a higher temperature, often leading to coloration of molded products, and a higher level of thermal degradation products such as acetaldehyde.

In contrast, the polymerization method according to the present invention is melt polymerization which makes the molecular weight of the resin more uniform and has no step of raising its crystallinity. Accordingly, the resin is not accompanied by fine powders that are formed in solid phase polymerization, narrower in molecular weight distribution and free of unmelted matter, which makes it possible to set resin temperature and applied shear at lower values in melt processing. Such setting of the conditions makes the resin of molded products have a less variable degree of polymerization, a lower coloration and a lower level of acetaldehyde formation.

The hue described in the above (E) was evaluated by measuring the optical transmission of a solution prepared by dissolving the polymer in HFIP at a concentration of 13% by weight. The value was evaluated according to the Hunter's color system, using an L-value and a b-value measured by a method in accordance with JIS Z8730. The hue E is given by the following equation:

$$E=(a^2+b^2+L^2)^{1/2}$$

The hue can be defined only if the values a, b, and L are indicated using the above relation. Transparent resins may be yellowish due to coloration. In order to visually reduce the yellowish tint, the resins are often loaded with a small amount of a blue dye, etc. Since the b value expresses a blue to yellow tint, loading a blue dye, etc. changes only the b-value but has little effect on the a-value which expresses a red to green tint. In connection with L-value, loading a dye decreases the L-value without fail, and thus the hue of transparent resins can be defined by the L-value and the b-value. Color tone of yellowish transparent resins may be often modified by addition of a blue dye, etc., to decrease the b-value (then, the L-value certainly decreases). Thus, the hue of transparent resins cannot be defined sufficiently only by the b-value but rather by a combination of the L-value and the b-value.

The PET resin and molded articles from the PET resin according to the present invention are characterized by a lower coloration than conventional counterparts. The inventive PET resin has a b-value of −1 to 1, preferably −0.5 to 0.5 and an L-value of 98.0 to 100, preferably 98.5 to 100.

As for the acetaldehyde content described in the above (F), the inventive PET resin contains not more than 10 ppm, preferably 7 ppm, and more preferably 5 ppm.

In the present invention, the acetaldehyde content was measured by a water extraction method. Up to now, the acetaldehyde content has been often measured quantitatively by the ASTM method (headspace-GC). However, in the ASTM method, the content of acetaldehyde evaporated by heating the resin is determined in the head space, and hence such a method does not extract the net content of acetaldehyde in the resin, resulting in a relatively low value of measurement. On the contrary, in the water extraction method used for the present invention, the acetaldehyde contained in the resin can be extracted so completely as to obtain a more accurate value of measurement. Both methods are proved to have a difference of about 3 ppm in value of measurement if the content of acetaldehyde is in the order of several ppm, where the water extraction method gives a higher value. Therefore, such values of measurement reported in prior art publications should be estimated as values 3 ppm higher when compared with the values described herein.

The inventive PET resin has many excellent characteristics such as a high degree of polymerizetion, easy quality control of melt-processed products, a good hue, and a low content of acetaldehyde. Thus, preforms for molding hollow bodies and hollow bodies both of which are of high quality, and also film, sheet, fibers and pellets, etc., which are all of high quality can be produced.

The present inventors evaluated closely the properties of the inventive PET resin as well as those of a variety of commercial PET resins which were produced by conventional methods of melt polymerization and solid phase polymerization. As a result, it was found that the presence of oligomer components in PET resins enhanced the rate of crystallization of the PET resins during melt processing. Such an effect of enhancing the rate of crystallization provides a higher productivity of injection molding, and is also associated with a number of advantages such as an improvement of mechanical properties of molded articles and a shorter period of heat treatment in production of hollow bodies for filling hot drinks. Compared with a known method of using a crystal nucleator to provide a similar effect, the inventive method is more advantageous in terms of not adversely affecting transparency and mechanical properties for stretchability and impact resistance of molded products. The content of oligomer components effective to enhance the rate of crystallization may range from 0.5 to 5.0 wt %. PET resins produced by solid phase polymerization typically contain approximately 0.4 wt % of oligomer components. The content of lower than 0.5 wt % of oligomer components is not sufficient to enhance the rate of crystallization, while the content of higher than 5.0 wt % is not preferable because it may lead to adversely affecting mechanical properties of molded products. The content of oligomer components may range more preferably from 0.8 to 3.0 wt % and still more preferably from 1.0 to 2.0 wt %.

A pellet which is at present commercially available and produced by solid phase polymerization has an acetaldehyde content of about 3 to 5 ppm. When this pellet is molded at an injection molding temperature of 280° C., which is usually carried out, the resultant molded article has an increased acetaldehyde content of about 16 to 20 ppm.

In contrast, surprisingly, a pellet of the present invention has an extremely small increase of acetaldehyde content by injection molding. In particular, when a pellet with an acetaldehyde content of not greater than 10 ppm, is molded at an injection molding temperature of 280° C. in the same manner as above, the acetaldehyde content of the resultant molded article never increases beyond 15 ppm. As a result, a higher-quality molded article with lower acetaldehyde content can be produced when compared to a molded article produced from the pellet of solid phase polymerization.

A conventional pellet of solid phase polymerization has a high degree of crystallinity. In addition, it contains many parts that particularly have a high degree of crystallinity and polymerization and also are difficult to melt, such as fine particles and pellet surfaces. Therefore, when a pellet is melt with a plasticizing device such as a screw, it causes a large shearing heat. In contrast, the pellet of the present invention has a low degree of crystallinity and contains no parts difficult to melt, the shearing heat thereof is considered small.

The pellet of the present invention is molded at an injection molding temperature of 280° C., the acetaldehyde content of the obtained molded article can be adjusted depending upon the acetaldehyde content of a pellet to be used or the degree of crystallinity or polymerization of the pellet. As the content is lower, it is more preferable. By using the pellet of the present invention having an acetaldehyde content of not greater than 5 ppm, it is possible to produce an injection molded article with an acetaldehyde content of not greater than 10 ppm.

The content of acetaldehyde in a perform formed by the PET resin of the present invention is usually not greater than 20 ppm, preferably not greater than 15 ppm, and more preferably not greater than 10 ppm. Further, the content of acetaldehyde in a blow molded article formed by the PET resin of the present invention is usually not greater than 15 ppm, preferably not greater than 10 ppm, and more preferably 7 ppm.

The b value of the perform formed by the PET resin of the present invention is usually −1 to 1, and preferably −0.6 to 0.6, and the L value is usually 96.0 to 100, and preferably 97.0 to 100. Further, the b value of the hollow article formed by the PET resin is usually −1 to 1 and preferably −0.7 to 0.7, and the L value is usually 96.0 to 100 and preferably 97.0 to 100.

Examples of the content that can be filled in a PArT hollow body produced by the present invention, include beverages such as beer, wine, rice wine, distilled liquor, fruit juice, carbonated soft drinks, oolong, green tea, foods such as fruits, nuts, vegetables, meat products, infant's foods, coffee, jam, mayonnaise, ketchup, edible oils, dressings, sauces, foods boiled in soy, milk, and milk products, as well as medicines, cosmetics and gasoline, but the present invention is not limited to these examples.

The PArT resin of the present invention has a slight decrease in viscosity and is stable during melt processing. Further, the content of low molecular weight impurities is small, and thus the resin is suitably used for co-molding with other resin. Also, since the occurrence of delamination by secondary molding is effectively prevented, a multi-layer container having no delamination, and excellent heat resistance, appearance property and functionality can be provided. According to a conventionally known method of co-molding, a multi-layer packaging material having layers formed by PArT resin of the present invention can be produced. A multi-layer structure can be prepared such as a cup, a tray, a bottle, a tube container, and a preform for container molding.

As a resin layer or the like which can be combined with a layer formed by the PArT resin of the present invention, used are an oxygen absorbing barrier layer, an odor barrier layer, and other resin layers which are conventionally known, and oxygen or odor barrier inorganic substance layer such as diamond-like carbon and amorphous silica.

Examples of the oxygen absorbing barrier layers include deoxidizing agent having as a main ingredient a reducing substance such as iron powder, and oxygen absorbing resin compositions containing transition metal catalysts such as a metal component of the Group VIII of periodic table, such as iron, cobalt, and nickel, as well as a metal of the Group I, such as copper or silver, a metal of the Group IV, such as tin, titanium, or zirconium, a metal component of the Group V, such as vanadium, a metal component of the Group VI, such as chromium, a metal component of the Group VII, such as manganese. The above transition metal catalysts are usually used in the form of an inorganic acid salt, an organic acid salt, and a complex salt of a low valency of the above-mentioned transition metals.

As the inorganic acid salt, there can be exemplified halides such as chlorides, oxyacid salts of sulfur such as sulfates, oxyacid salts of nitrogen such as nitrates, phosphorus oxyacid salts such as phosphates, and silicates.

On the other hand, as organic acid salts, there can be exemplified carboxylates, sulfonates, and phosphonate. Among them, carboxylates are suitable for the object of the present invention. Examples thereof include transition metal salts of acetic acid, propionic acid, isopropionic acid, butanoic acid, isobutanoic acid, pentanoic acid, isopentanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroselinic acid, oleic acid, linoleic acid, linolenic acid, arachidonic acid, formic acid, oxalic acid, sulfamic acid, and naphthenic acid.

Meanwhile, as the transition metal complex, used are complexes with a β-diketone or a β-keto-acid ester. Examples of β-diketone or β-keto-acid ester usable herein include acetylacetone, ethyl acetoacetate, 1,3-cyclohexanedione, methylenebis-1,3-cyclohexanedione, 2-benzyl-1,3-cyclohexanedione, acetyltetralone, palmitoyltetralone, stearoyltetralone, benzoyltetralone, 2-acetylcyclohexanone, 2-benzoylcyclohexanone, 2-acetyl-1,3-cyclohexanedione, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl)methane, benzoylacetylphenylmethane, stearoyl(4-methoxybenzoyl)methane, butanoylacetone, distearoylmethane, acetylacetone, stearoylacetone, bis(cyclohexanoyl)-methane and dipivaloylmethane.

The resin composition has a low permeability to a gaseous substance such as oxygen or carbon gas, a good processing property, and further it is transparent and has a sufficient mechanical strength. Accordingly, the resin composition includes a composition prepared from particularly ethylene-vinyl alcohol copolymer, or a polyamide (hereafter abbreviated as Nylon MXD6) obtained by polycondensation reaction between a diamine component comprising as a main ingredient m-xylylenediamine and a dicarboxylic acid component comprising as a main ingredient adipic acid, or the like. The composition should be formed so as to impart oxygen absorption property by adding and mixing a small amount of a compound with the above deoxidation functionality and with the ethylene-vinyl alcohol copolymer or the polyamide or the like. Such resin composition can be used as an oxygen barrier, etc. for constituting a container or a packaging material.

As specific example of odor barrier layer, ethylene-vinyl alcohol copolymer, polyamide resin, and polyester resin, for example, can be used. Further, other examples of the odor barrier layer include olefin resins such as cyclic olefin resin, in particular a copolymer of ethylene and cyclic olefin. The resin constituting the above odor barrier layer preferably has a glass transition point (Tg) of not less than 50° C.

The odor barrier layer preferably contains a deodorizer or an adsorbent. This allows an odor component to be adsorbed and more effectively prevents the odor component from moving inside the multi-layer structure.

As a deodorizer or adsorbent, known substances, for example, natural zeolite, synthetic zeolite, silica gel, activated carbon, impregnated charcoal, activated clay, activated aluminum oxide, clay, diatomaceous earth, kaolin, talc, bentonite, magnesium oxide, ion oxide, aluminum hydroxide, magnesium hydroxide, ion hydroxide, magnesium silicate, aluminum silicate, synthetic hydrotalcite, and amine-carrying porous silica are used either alone or in combination of two or more kinds. In terms of reactivity with aldehyde, substances such as amine-carrying porous silica containing amino group is particularly preferable. These deodorizers or adsorbents preferably have an average particle diameter of not greater than 10 μm in usual dispersion so as to be evenly dispersed in the odor barrier layer.

These deodorizers or adsorbents are preferably used to be present in the odor barrier layer at 0.1 to 5% by weight. These substances may be added as they are, but it is preferable to add them as master batch from a viewpoint of dispersibility.

As a specific example of other resin layer, any resin that has been known can be used. Examples thereof include thermoplastic polyesters such as polyethylene terephthalate (PET), polyethylene naphthalate (PEN), and polybutylene terephthalate; polycarbonates; acryl-butadiene-styrene copolymer (ABS resin); polyacetal resin; nylon 6, nylon 66, MXD6 nylon, and nylons such as copolymer of these nylons; acrylic resin such as polymethyl methacrylate; isotatic polypropylene; polystyrene, low-, medium-, or high-density polyethylene, ethylene-propylene copolymer, ethylene-butene-1 copolymer, and styrene-butadiene thermoplastic elastomer.

Further, as a biodegradable resin to be used for a multilayer resin container, saturated polyester resins comprising a hydroxyalkanoate unit(s) as main constituent, such as polyhydroxybutylate (PHB), random copolymer of 3-hydroxybutylate (3HB) and 3-hydroxyvalerate (3HV), random copolymer of branched 3-hydroxybutylate (3HB) and 3-hydroxyvalerate (3HV), poly($\epsilon$-caprolactone) (PCL), and polylactic acid (PLLA), and aliphatic polyesters, in particular polybutylene succinate (PBS), polybutylene succinate adipate (PBAS) can be suitably used either alone or in combination of two or more kinds.

Further, the biodegradable resin includes a polyester comprising not less than 20% by weight of an aliphatic dibasic carboxylic acid and an aromatic dibasic carboxylic acid, for example, polybutylene terephthalate/adipate.

In preparing the laminate, an adhesive resin may, as required, be interposed among the resin layers. As the above-mentioned adhesive resin, there can be exemplified a thermoplastic resin containing carbonyl groups based on carboxylic acid, carboxylic anhydride, carboxylate, carboxylic acid amide or carboxylic acid ester on the main chain or on the side chain at a concentration of 1 to 700 meq/100 g of the resin and, particularly, at a concentration of 10 to 500 meq/100 g of the resin.

Suitable examples of the adhesive resin include ethylene acrylic acid copolymer, ionically crosslinked olefin copolymer, maleic anhydride-grafted polyethylene, maleic anhydride-grafted polypropylene, acrylic acid-grafted polyolefin, ethylene-vinyl acetate copolymer, copolymerized polyester and copolymerized thermoplastic resin. These may be used either alone or in combination of two or more kinds. These resins are useful for laminating layers by a simultaneous extrusion, a sandwich lamination or the like.

Further, pre-formed oxygen-absorbing barrier resin film, odor barrier resin film, and humidity resistance resin film are adhered and laminated by also using a thermosetting adhesive resin such as an isocyanate or epoxy type.

The PArT resin of the present invention has high-quality such as excellent hue and low impurity content, and has an extremely high polymerization degree. The melt polymerized resin can be transferred to a molding machine in a molten state and molded. Therefore, it is possible to produce a molded article which is formed by the PArT resin with high quality and high polymerization degree and has excellent mechanical properties such as high strength and high toughness, which cannot be produced by a conventional molding machine. As a result, the resin can be used for collectable/recyclable returnable bottles for the above-mentioned various contents such as milk, drinking water, alcohol, and soft drinks, and resin fuel tanks for automobiles and motorcycles.

For these uses, combined techniques can be applied with a resin layer or an inorganic layer for enhancing the above barrier property.

Next, one example of preferable polymerization reactors to be used in the present invention will be described based on the figures.

FIG. 1 shows an example of a polymerization reactor for achieving the method of the present invention. PArT prepolymer is fed into the polymerization reactor 10 from a feed opening 2 via a transfer pump 1, and goes through a perforated plate 3 so as to be introduced into the inside of the polymerization reactor, then falling down along a support 5. The inside of the polymerization reactor is controlled to have a predetermined reduced pressure, and alkylene glycol distilled from the prepolymer or inert gas such as nitrogen gas, which is introduced from an inert gas feed opening 6 as required, is discharged from an evacuation port 7. The polymer product is discharged from an outlet 9 with a drainage pump 8. The polymerization reactor 10 or the like is heated and kept warm by heater or a jacket.

Figure 2:
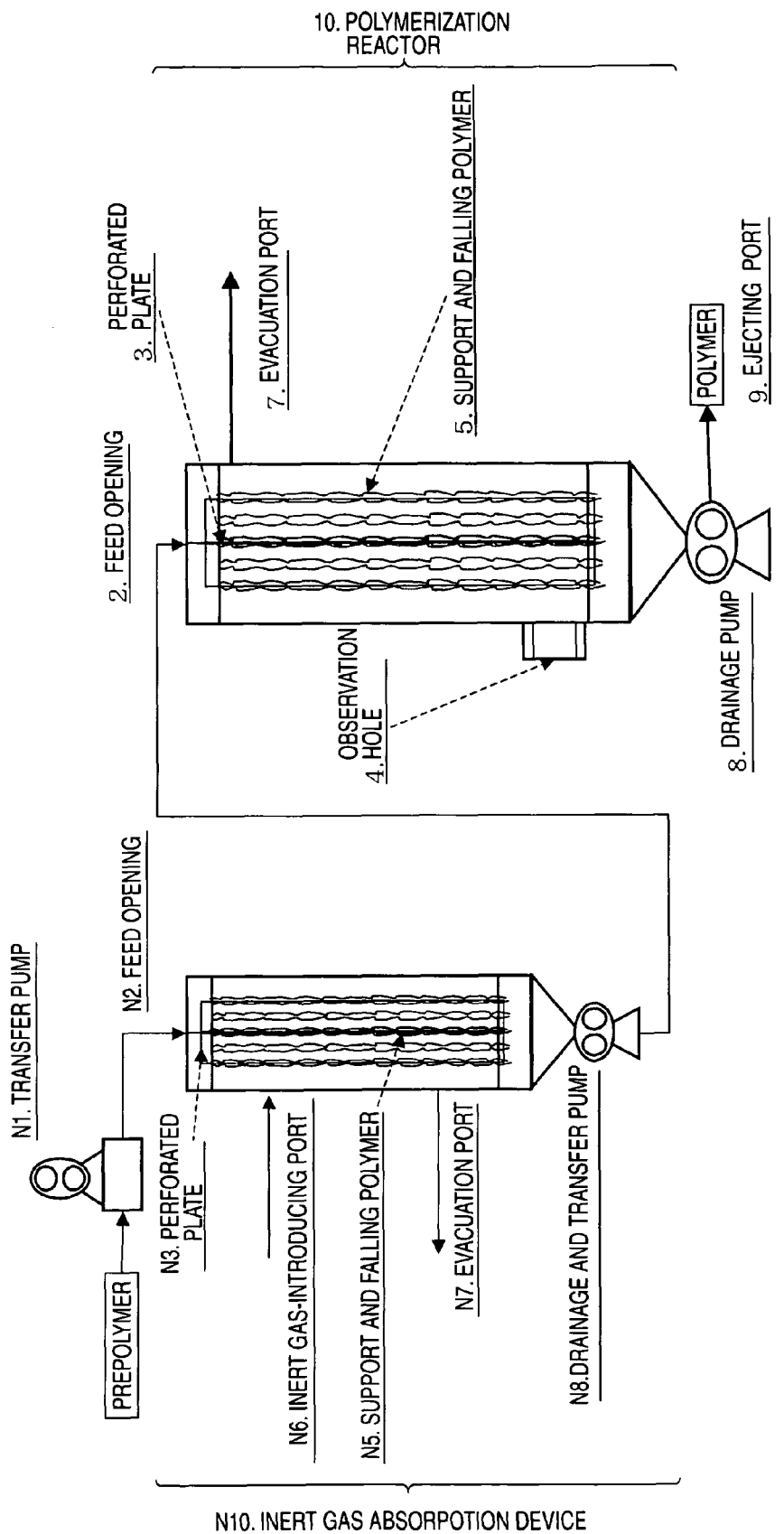
FIG. 2 is a schematic view showing the inert gas absorption device and the polymerization reactor used in the present invention.

FIG. 2 shows an example of a polymerization reactor to achieve the method of the present invention in which an inert gas absorption apparatus is used. The PArT prepolymer is fed into the inert gas absorption apparatus N10 from a feed opening N2 via a transfer pump N1 and goes through a perforated plate N3 to be introduced into the inert gas absorption apparatus, falling down along a support N5. The inside of the inert gas absorption apparatus is controlled to have a predetermined reduced pressure with an evacuation port N7. The prepolymer absorbs an inert gas such as nitrogen gas introduced from the inert gas-introducing port N6 while being allowed to fall. The prepolymer is then fed into a polymerization reactor 10 from a feed opening 2 via a drainage/transfer pump N8, and goes through a perforated plate 3 to be introduced into the polymerization reactor, falling down along support 5. The inside of the polymerization reactor is controlled to have a predetermined reduced pressure, and alkylene glycol distilled from the prepolymer may be discharged from an evacuation port 7. The polymer product is discharged from an outlet 9 with a drainage pump 8. The polymerization reactor 10 or the like is heated and kept warm by a heater or a jacket.

Figure 3:
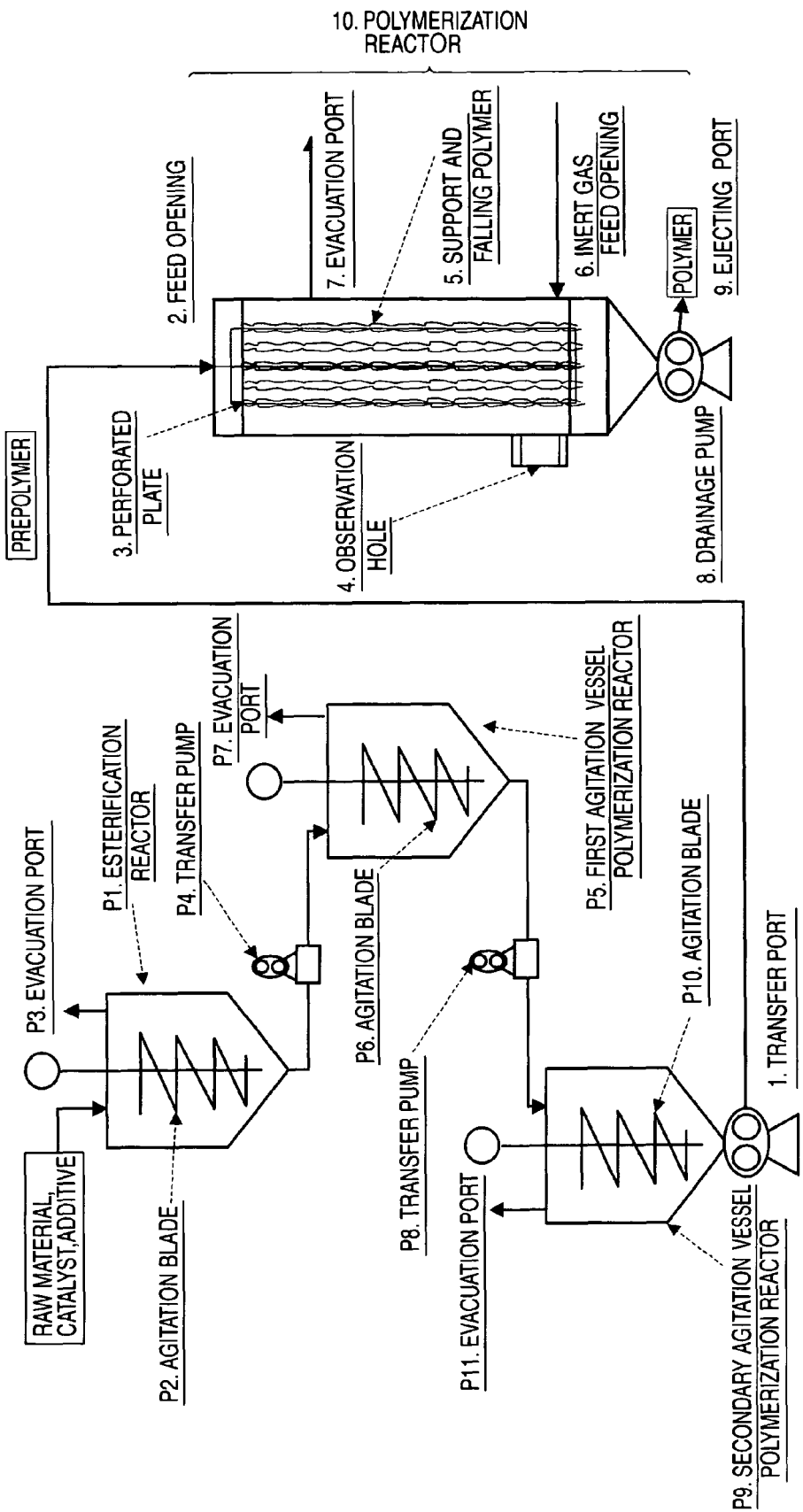
FIG. 3 is a schematic view showing an example of an apparatus whereby the method of the present invention can be applied.
Figure 4:
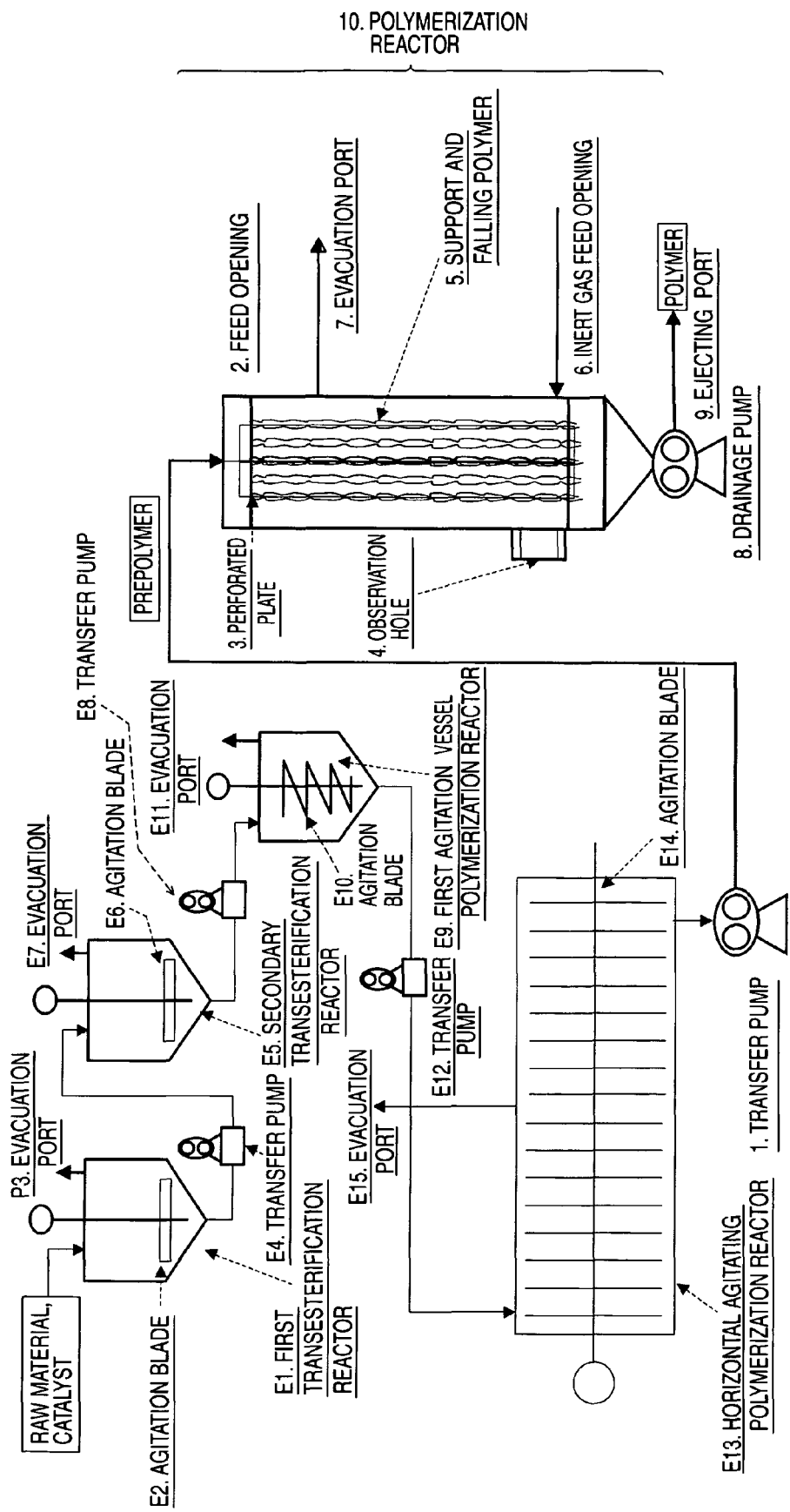
FIG. 4 is a schematic view showing an example of an apparatus whereby the method of the present invention can be applied.

FIGS. 3 and 4 are schematic views showing one example of an apparatus to achieve the method of the present invention. FIG. 3 shows one exemplary apparatus whereby bis-hydroxyalkyl terephthalate, an intermediate of PArT is obtained directly by esterification reaction, and then PArT prepolymer is produced by polycondensation reaction of the intermediate and fed into the polymerization reactor 10 of the present invention and polymerized. FIG. 4 shows one exemplary apparatus whereby an intermediate is obtained by ester interchange reaction, and then PArT prepolymer is produced by combining an agitation vessel polymerization reactor and a horizontal agitating polymerization reactor and fed into the polymerization reactor 10 of the present invention and polymerized.

In all the methods, the resin falls along the support and falls down to the lower part of the polymerization reactor, and thereafter the resin is withdrawn through the outlet with the drainage pump. At this time, it is preferable to reduce the amount of the resin accumulated at the lower part of the polymerization reactor to a level as small as possible and keep the amount as constant as possible. This prevents development of coloration or reduction of polymerization caused by thermal decomposition, and easily suppresses quality variation of the resin. As a method for controlling the accumulated amount, the flow rates of the transfer pump and drainage pump can be adjusted by observing the accumulated amount through an observation hole or by observing the accumulated amount with a level meter such as electrostatic capacity type, thereby enabling the control of the accumulated amount.

The polymerization reactor to be used in the present invention can be provided with an agitator at the bottom thereof, but it is not particularly required necessarily. Therefore, it is possible to omit a rotary driving part in a polymerization reactor, and to carry out polymerization under a condition wherein sealing is sufficiently conducted under high vacuum. The rotary driving part of the drainage pump is covered with the resin to be discharged, and thus the polymerization reactor of the present invention has a much better sealing property than a polymerization reactor with a rotary driving part.

The method of the present invention can be carried out with one polymerization reactor, but may be carried out with two or more reactors. In addition, one polymerization reactor may be divided vertically or horizontally, and used as a multi-stage polymerization reactor.

In the present invention, a process for increasing the molecular weight from PArT prepolymer to a target PArT with high polymerization degree can be carried out by a method whereby the entire prepolymer is polymerized while being allowed to fall along a support from holes of a perforated plate. The process is preferably carried out in a combination with other polymerization methods, such as an agitation vessel polymerization reactor or a horizontal agitating polymerization reactor.

As the horizontal agitating polymerization reactor, there are exemplified a screw type, an independent blade type, an uniaxial type, and a biaxial type polymerization reactor, for example a polymerizetion reactor described in Chapter 4 of "Research Report of Research Group on Reaction Engineering: reactive processing Part 2" (the Society of Polymer Science; 1992).

Further, as the agitation vessel polymerization reactor, all the agitating vessels described in Chapter 11 of Kagakusochi Binran (phonetic translation) (edited by the Society of Chemical Engineers, Japan; 1989), etc. The shape of the vessel is not particularly limited, and a vertical or horizontal cylinder is usually used. In addition, the shape of agitation blade is not particularly limited, and a paddle type, an anchor type, a turbine type, a screw type, a ribbon type, and double blade type may be used.

A process for producing prepolymer from raw materials may be carried out in a batch manner or in a continuous manner. When it is carried out in a batch manner, the entire amount of raw materials and reactants is fed into the reaction reactor and reacted for a predetermined time. Thereafter, the entire reactants are transferred to a subsequent reaction reactor. On the other hand, when it is carried out in a continuous manner, the raw materials or the reactants are fed into each reaction reactors continuously and the reactants are discharged continuously. To produce PET with uniform quality level in mass, it is preferable to conduct the process in a continuous manner.

A material for a polymerization reactor to be used for the present invention is not particularly limited, and the material is usually selected from stainless steel, nickel, glass lining and the like.

Figure 5:
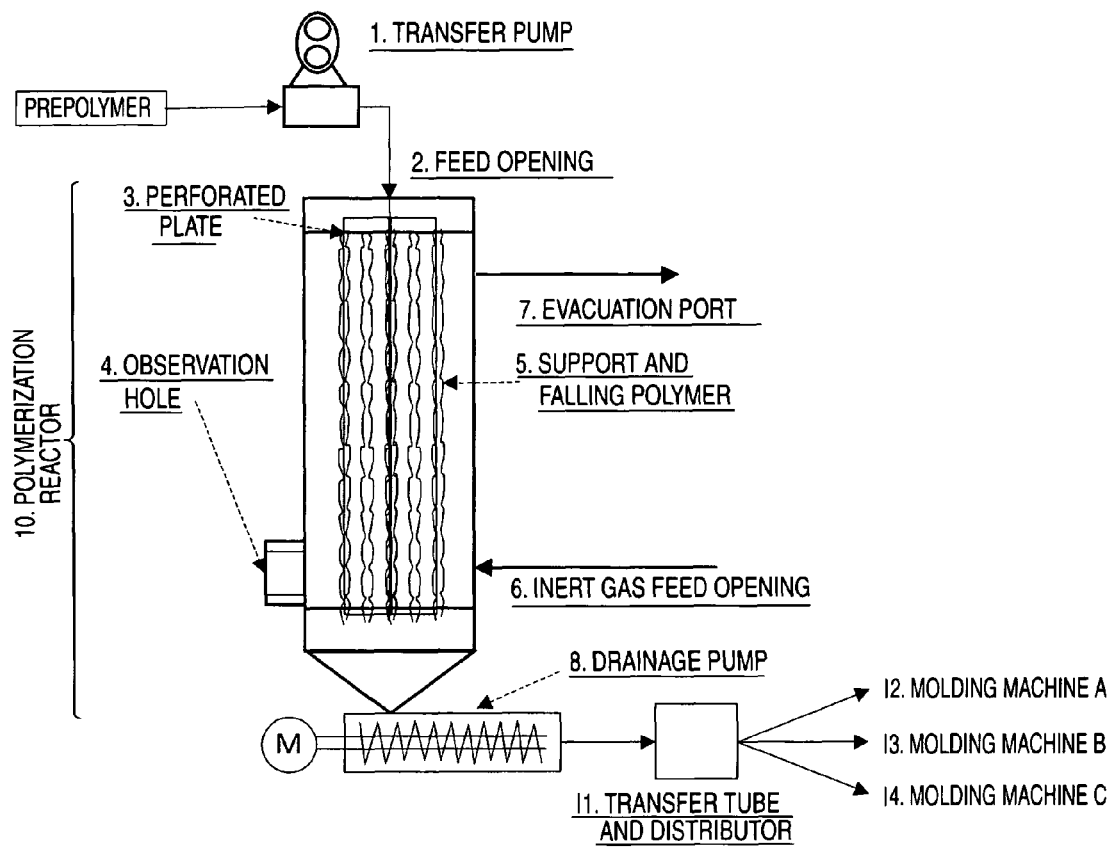
FIG. 5 is a schematic view showing an example of the polymerization reactor and the molding machine used in the present invention.
Figure 6:
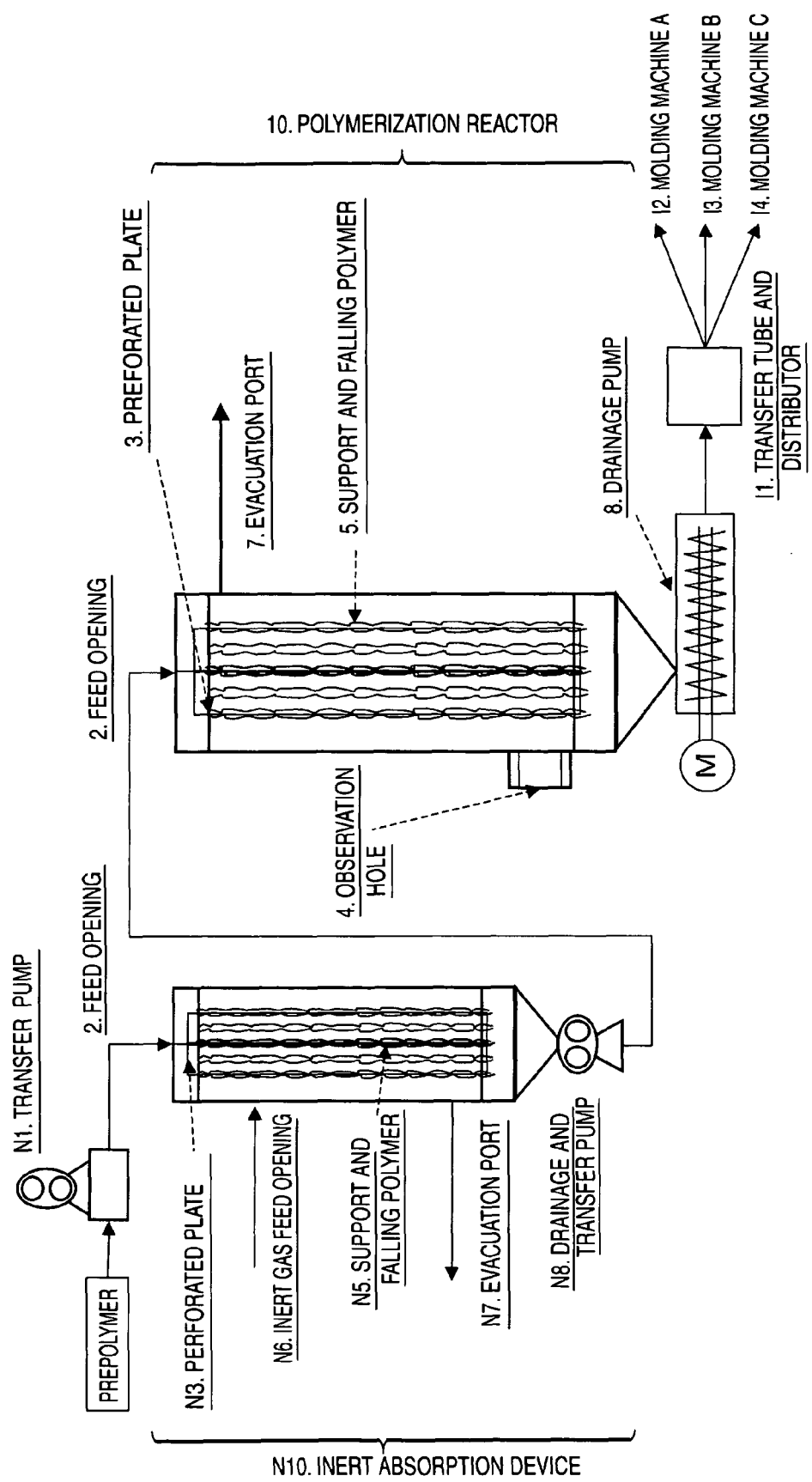
FIG. 6 is a schematic view showing an example of the inert gas absorption device, the polymerization reactor, and the molding machine used in the present invention.

Next, FIGS. 5 and 6 show embodiments of preferable combination in producing PArT resin and its molded article, but the present invention is not limited to these embodiments.

FIG. 5 is a schematic view showing one example of a polymerization reactor and molding machines to be used in the present invention. PArT prepolymer is fed into a polymerization reactor from a feed opening 2 via a transfer pump 1, and goes through a perforated plate 3 to be introduced into the polymerization reactor 10, falling along a support 5. The inside of the polymerization reactor is controlled to have a predetermined reduced pressure, and alkylene glycol distilled from the prepolymer or inert gas such as nitrogen gas, which is introduced from an inert gas feed opening 6 as required, is discharged from an evacuation port 7. The polymer is continuously discharged with a drainage pump 8, and thereafter fed to molding machines A to C (I2 to I4) by a transfer piping and a distributor I1 and then molded. Three or more molding machines can be connected. The transfer pump, polymerization reactor, drainage pump, transfer piping and distributor are heated and kept warm by heater or a jacket.

FIG. 6 is a schematic view showing one example of an inert gas absorption apparatus, a polymerization reactor, and molding machines.

In all the methods, the polymerized resin falls down to the lower part of the polymerization reactor; thereafter the resin is withdrawn from the polymerization reactor 10 with the drainage pump 8; and the resin is fed to molding machines A to C (I2 to I4) with a transfer piping and a distributor I1 for molding.

At this time, it is preferable to reduce the amount of the resin fallen and accumulated at the lower part of the polymerization reactor to a level as small as possible and keep the amount as constant as possible. This prevents development of coloration or reduction of polymerization caused by thermal decomposition, and easily suppresses quality variation of the resin. As a method for controlling the accumulated amount, the flow rates of the transfer pump 1 and drainage pump 8 can be adjusted by observing the accumulated amount through an observation hole 4 or by observing the accumulated amount with a level meter such as electrostatic capacity type, thereby enabling the control of the accumulated amount.

A method for transferring the polymerized resin to a molding machine is not particularly limited, but a gear pump, an extruder and the like may be used. Further, a method of the transfer includes continuous transfer and intermittent transfer, but in any case it is necessary to carry out both the transfer and molding within the above-mentioned time period. In the case of the intermittent transfer, discharging from the polymerization reactor can be also carried out intermittently. As shown in FIG. 5, it is more preferable that resin discharge from the polymerization reactor be carried out continuously and that the transfer piping and distributor I1 are installed between the polymerization reactor and molding machines so that the transfer is changed over in turn among two or more molding machines for intermittent transfer (for example, three machines are shown in FIG. 5, but more machines may be used). Besides, a known apparatus, for example, an apparatus composed of a reservoir and a piston, may be installed, or it is also preferable to install a device, referred to as an accumulator, which temporarily stores the resin.

In the present invention, a molding machine is an apparatus for making a molten resin into a specific shape, and an extruder, an injection molding machine, and a blow molding machine, for example, are used. As an article molded by the molding machine, a bottle, a preform for bottle, film, a sheet, a tube, a stick, fiber, and various shapes of injection molded articles are molded. Among these articles, the present invention is suitable for the production of a preform for a beverage use bottle. A beverage use bottle is strongly desired to have excellent strength, and transparency. Also, it is strongly desired to reduce low-molecular-weight volatile impurities such as acetaldehyde as a representative example in the case of PET, which adversely affect the taste and odor of the content. In addition, there is a strong desire to produce the bottles at high productivity and low cost.

The present invention will be described in the examples described below.

Main measurement values given in the examples were measured by the following methods:

(1) Intrinsic VISCOSITY [η]

Intrinsic viscosity [η] was measured with an Ostwald viscometer, by extrapolating the ratio ηsp/C between a specific viscosity ηsp and a concentration C (g/100 ml) to zero concentration and using the following formula:

$$[\eta] = \lim_{C \to 0} (\eta sp/C)$$

(2) Crystalline Melting Point

Crystalline melting point was measured using Pyris 1 DSC (a differential scanning calorimeter of compensation type) manufactured by Perkin Elmer under the conditions indicated below. A peak value of an endothermic peak derived from melting of a crystal was defined as a crystalline melting point. The peak value was determined using an analysis software attached with the above instrument.

Measurement temperature: 0° C. to 300° C.
Temperature rising rate: 10° C./min (3) Carboxyl-terminal Group Concentration 1 g of a sample was dissolved in 25 ml of benzyl alcohol, and 25 ml of chloroform was then added thereto. Thereafter, titration was carried out with a 1/50 N potassium hydroxide benzyl alcohol solution. Using a titration value VA (ml) and a blank value V0 obtained in the absence of PET, a carboxyl-terminal group concentration was obtained according to the following formula:

Carboxyl-terminal group concentration (meq/kg)= $(VA-V0) \times 20$ (4) Hue of Resin (L* Value, B* Value)

A resin was subjected to a heat treatment at 150° C. for 60 minutes, so that it could be crystallized. Thereafter, using a color computer manufactured by Suga Test Instruments Co., Ltd., the hue of the resin was evaluated according to a method that is in conformity with JIS Z8729.

(5) Color Tone of Resin Evaluated in Form of Solution (L Value, B Value)

1.5 g of a sample was dissolved in 10 g of HFIP (1,1,1,3,3,3-hexafluoro-2-propanol), and the obtained solution was analyzed by the optical transmission method using UV-2500PC (an ultraviolet-visible spectrophotometer) manufactured by Shimadzu Corporation. It was then evaluated according to a method that is in conformity with JIS Z8730 using an analysis software attached with the above instrument.

(6) Acetaldehyde Content 1 (Dissolution-reprecipitation Extraction Method)

1 g of a sample was finely cut, and the cut sample was then added to 10 ml of 1,1,1,3,3,3-hexafluoro-2-propanol, followed by dissolving it by application of ultrasonic wave. 10 ml of water was then added to the solution to reprecipitate polymer components. Acetaldehyde contained in the supernatant was analyzed using a gas chromatograph-mass spectrometer under the following conditions:

Column: VOCOL (60 m×0.25 mmϕ×film thickness 1.5 μm)
Temperature conditions: retain at 35° C. for 10 minutes, rise the temperature to 100° C. at a rate of 5° C./min., and further rise the temperature to 100° C.-220° C. at a rate of 20° C./min.
Temperature of injection port: 220° C.
Injection method: Split method (split ratio=1:30), 1.0 μl
Measurement method: SIM method
Monitor ion: m/z=29, 43, 44

(7) Content of Impurities, Acetaldehyde Content 2 (Water Extraction Method)

A sample was finely cut, and the cut sample was then subjected to frost milling using a 6700 freezer mill (frost milling machine) manufactured by SPEX for 3 to 10 minutes under cooling with liquid nitrogen, so as to prepare powders having a grain size between 850 and 1,000 μm. 1 g of the powders and 2 ml of water were placed into a glass ampule, followed by nitrogen substitution. Thereafter, the tube was sealed, and heated at 130° C. for 90 minutes, so as to extract impurities such as acetaldehyde. The ampule was cooled and then opened. The content of impurities was analyzed using GC-14B (gas chromatograph) manufactured by Shimadzu Corporation under the following conditions:

Column: VOCOL (60 m×0.25 mmϕ×film thickness 1.5 μm)
Temperature conditions: retain at 35° C. for 10 minutes, rise the temperature to 100° C. at a rate of 5° C./min., and further rise the temperature to 100° C.-220° C. at a rate of 20° C./min.
Temperature of injection port: 220° C.
Injection method: Split method (split ratio=1:30), 1.5 μl
Measurement method: FID method (8) Molecular Weight Distribution A sample was dissolved in 1,1,1,3,3,3-hexafluoro-2-propanol as an eluant (in which 5 mmol/l trifluoroacetic acid sodium salt was dissolved) at a concentration of 1.0 mg/ml. Thereafter, the obtained solution was analyzed using HLC-8020GPC (gel permeation chromatograph) manufactured by TOSOH CORPORATION under the conditions described below. It was then evaluated using an analysis software attached with the above instrument.

Column: HFIP-606M+HFIP-603 (Shodex)
Column temperature: 40° C.
Injection amount: 30 μl
Measurement method: RI detector, in terms of PMMA (9) Oligomer Content 1 g of a sample was completely dissolved in a mixed solution consisting of 10 g of 1,1,1,3,3,3-hexafluoro-2-propanol and 5 g of chloroform. Thereafter, 15 g of chloroform was further added to the solution, followed by dilution. While the diluted solution was stirred with a magnetic stirrer, 100 g of tetrahydrofuran was added dropwise thereto, so that the sample was reprecipitated. The precipitate was filtrated. From the solution from which the precipitate was removed, the solvent was further removed with an evaporator. Thus, an oligomer was recovered as a residue, and the weight of the residue was then measured.

(10) Crystallization Rate

Crystallization rate was measured using Pyris 1 DSC (a differential scanning calorimeter of input compensation type) manufactured by Perkin Elmer under the conditions indicated below. A time required from the initiation of process (III) to exothermic peak derived from crystallization was defined as an index of the crystallization rate. The peak time was determined using an analysis software attached with the above instrument.

(I) The sample was retained at 300° C. for 2 minutes;
(II) The temperature was decreased from 300° C. to 225° C. at a rate of 100° C./min.;
(III) The temperature was retained at 225° C. for 30 minutes (crystallization).

The properties of prepolymers used in the examples are shown in Table 1, and the shapes of supports in polymerization reactors are shown in Table 2.

Example 1

Using the apparatus shown in FIG. 1, a PET prepolymer having an intrinsic viscosity [η] of 0.45 dl/g, a carboxyl-terminal group concentration of 30 meq/kg, and a crystalline melting point of 260° C. was supplied through a feed opening 2 to a polymerization reactor 10 by a transfer pump 1. The PET prepolymer that was in a molten state at 280° C. was discharged from holes on a perforated plate 3 at an amount of 10 g/min. per hole. Thereafter, the prepolymer was polymerized under reduced pressure of 65 Pa, while it was allowed to fall along a support at the same ambient temperature as the discharge temperature of the prepolymer. The resultant product was then removed from an ejecting port 9 by a drainage pump 8, so as to obtain PET. The used perforated plate had a thickness of 50 mm, and had 4 holes thereon, each having a diameter of 1 mm, which were linearly aligned at an interval of 25 mm. As a support, a lattice-form support was used, wherein a wire having a diameter of 2 mm and a length of 8 m was attached very close to each hole and vertically hung therefrom, and other wires each having a diameter of 2 mm and a length of 100 mm were orthogonally attached to the above wires at an interval of 15 mm. The material of the support was stainless steel. A drainage pump was operated, while it was observed through an observation hole such that almost no polymer was accumulated in the bottom portion of the polymerization reactor. A prepolymer produced by adding 0.04% by weight of diantimony trioxide and 100 ppm of trimethyl phosphate as a weight ratio of phosphorous element was used. The polymerization results are shown in Table 6. The residence time was 60 minutes at this time. It is to be noted that such a residence time was calculated by dividing the amount of a polymer remaining in the polymerization reactor by the amount of a polymer supplied. During the polymerization, intensive foaming of the prepolymer discharged from the perforated plate and contamination of a nozzle surface or wall due to such intensive foaming were observed to an extremely small extent. Further, it is observed that the falling resin contained a large amount of bubbles, and the resin rolled down on a support in a bubble form, while it wrapped a wire located in the longitudinal direction of the support. During this process, the falling resin was captured on videotape through an observation hole, and a mean radius of the falling resin wrapping a wire that is in a longitudinal direction as a center was calculated using 5 pieces of static images taken at an interval of 3 minutes. As a result, the mean radius was found to be 1.05 cm. From this value, it was calculated that $S_1=21,100$ cm$^2$. Since the total surface area of the support was 5,357 cm$^2$, $S_1/S_2=3.9$.

The obtained polymer had a high polymerization degree and a good color tone. Further, when the content of acetaldehyde was evaluated by the dissolution-reprecipitation extraction method, it was found that the value was reduced to be 25 ppm. Thus, the obtained polymer was high-quality homogenous PET.

When the acetaldehyde content was evaluated again by the water extraction method, it was found to be 40 ppm. This is because, in the case of the dissolution-reprecipitation extraction method, a part of acetaldehyde was volatized due to heat generation during reprecipitation by addition of water, and also because a part of acetaldehyde was adsorbed on a resin precipitated.

EXAMPLES 2 AND 3

Polymerization was carried out in the same manner as in Example 1 with the exception that the conditions shown in Table 6 were applied. Polymerization conditions and the properties of the obtained resins are shown in Table 6. In both cases of Examples 2 and 3, intensive foaming of a prepolymer discharged from a perforated plate during polymerization and contamination of a nozzle surface and the like due to such intensive foaming were observed to an extremely small extent. The falling resin contained a large amount of bubbles. The obtained polymer had a high polymerization degree and a good color tone, containing a small amount of acetaldehyde. Thus, it was high-quality homogenous PET.

COMPARATIVE EXAMPLES 1 TO 4

Polymerization was carried out in the same manner as in Example 1 with the exception that the conditions shown in Table 6 were applied. Polymerization conditions and the properties of the obtained resins are shown in Table 6. In the case of Comparative example 1, since the discharge temperature was too high, contamination of a nozzle surface and a wall due to intensive foaming was observed. The obtained polymer was colored to become yellow, and its color tone was uneven.

In the case of Comparative example 2, since the discharge temperature was set at too low, a prepolymer was solidified, and it could not be discharged from a perforated plate.

In the case of Comparative example 3, since a prepolymer had an intrinsic viscosity [η] of 0.18 dl/g that was too low, the polymer discharged form a perforated plate intensively foamed, and thus, significantly contaminated a nozzle surface or the wall of a polymerization reactor. The falling polymer did not contain a large amount of bubbles, and the obtained polymer contained large quantities of black foreign substances (heat deterioration products). Also, it had a low polymerization degree.

In the case of Comparative example 4, since the inside of a polymerization reactor was kept under a normal pressure, the falling polymer did not contain a large amount of bubbles. Thus, a polymerization degree did not increased, but rather decreased due to pyrolysis.

COMPARATIVE EXAMPLE 5

As a perforated plate 3, a plate on which 10 holes were disposed in the form of a circle. As a support, a pipe having an inside diameter of 15 cm and a length of 8 m (a support 5 described in Table 2) was installed. A prepolymer discharged through holes were allowed to fall along the internal wall of the pipe. Other than these conditions, polymerization was carried out in the same manner as in Example 1. Polymerization conditions and the properties of the obtained resin are shown in Table 6. When the flow of the prepolymer falling from the bottom edge of the pipe was observed through an observation hole 4, the prepolymer did not contain a large amount of bubbles. The obtained polymer had an uneven color tone and a low polymerization degree. When the pipe was removed to observe the inside thereof, a trail of the drift of the polymer (a line of a yellow-colored polymer) was observed.

EXAMPLES 4 TO 6

A prepolymer was discharged from a perforated plate on which 4 holes were aligned in a lattice form at a rate of 23 g/min. per hole. Thus, polymerization was carried out in the same manner as in Example 1 with the exception that a support having a form described below was used. In Example 4, a space lattice-form support formed by combining wires with a diameter of 3 mm at an interval of 30 mm in the vertical direction and at an interval of 50 mm in the horizontal direction was used; in Example 5, a chain-form support obtained by connecting elliptical forms with a wire diameter of 3 mm, a length of 50 mm, and a curvature of 20 mm was used; and in Example 6, a wire-form support having a circular cross section with a diameter of 5 mm was used (which correspond to supports 2 to 4 described in Table 2, respectively). Polymerization conditions and the properties of the obtained resins are shown in Table 6. In all the cases, intensive foaming of a prepolymer discharged from a perforated plate and contamination of a nozzle surface and the like due to such intensive foaming were observed to an extremely small extent. The falling resin contained a large amount of bubbles. The obtained polymer had a high polymerization degree and a good color tone, containing a small amount of acetaldehyde. Thus, it was high-quality homogenous PET. Among the above described supports, the use of supports having a structure that impedes the falling of a polymer, such as space lattice-form and chain-form supports, enabled the production of a polymer with a higher polymerization degree under the same conditions.

EXAMPLE 7

Using the apparatus shown in FIG. 3, and using terephthalic acid and EG as materials, PET was polymerized at a rate of 2.4 kg/hr on average by the continuous polymerization method. Vertical agitating polymerization reactors having a paddle agitation blade were used as an esterification reactor, a first agitation vessel polymerization reactor, and a second agitation vessel polymerization reactor. As a final polymerization reactor, the same polymerization reactor as described in Example 1 was used.

A slurry mixture comprising terephthalic acid and EG at a molar ratio of 1:1.2 was continuously supplied to the esterification reactor, and polymerization was carried out under conditions described in Tables 3 and 6, so as to obtain PET. In this process, with respect to a polymer obtained in the first agitation vessel polymerization reactor, 0.04% by weight of diantimony trioxide, 20 ppm trimethyl phosphate (in terms of phosphorous element), and 0.05% by weight of pentaerythritol-tetrakis [3-(3,5-di-tertbutyl-4-hydroxyphenyl)propionate] were continuously added. It is to be noted that each of diantimony trioxide, trimethyl phosphate, and pentaerythritol-tetrakis [3-(3,5-di-tertbutyl-4-hydroxyphenyl)propionate] was added in the form of an EG solution containing 2% by weight of each compound. Polymerization conditions and the properties of the obtained resin are shown in Table 6. A prepolymer supplied to the final polymerization reactor (prepolymer 5 described in Table 1) was included in the scope of the present invention. Intensive foaming of the prepolymer discharged from a perforated plate and contamination of a nozzle surface and the like due to such intensive foaming were observed to an extremely small extent. The falling resin contained a large amount of bubbles. The obtained polymer had a high polymerization degree and a good color tone, containing a small amount of acetaldehyde. Thus, it was high-quality homogenous PET.

EXAMPLE 8

Using the apparatus shown in FIG. 4, and using DMT and EG as materials, PET was polymerized at a rate of 2.4 kg/hr on average by the continuous polymerization method. Vertical polymerization reactors having a turbine agitation blade were used as first and secondary transesterification reactors. A vertical agitating polymerization reactor having a paddle agitation blade was used as a first agitation vessel polymerization reactor, a horizontal agitating polymerization reactor having a uniaxial disk agitation blade was then used, and the same polymerization reactor as described in Example 1 was used as a final polymerization reactor.

DMT and an EG solution containing manganese acetate added at 0.05% by weight based on DMT, at a molar ratio of 1:2, were continuously supplied to the esterification reactor, and polymerization was carried out under conditions described in Tables 4 and 6, so as to obtain a polymer. In this process, with respect to a polymer obtained from a tube disposed between the secondary transesterification reactor and the first agitation vessel polymerization reactor, 100 ppm of trimethyl phosphate (in terms of phosphorous element) and 0.04% by weight of diantimony trioxide were continuously added. It is to be noted that each of trimethyl phosphate and diantimony trioxide was added in the form of an EG solution containing 2% by weight of each compound. Polymerization conditions and the properties of the obtained resin are shown in Table 6. A prepolymer supplied to the final polymerization reactor (prepolymer 6 described in Table 1) was included in the scope of the present invention. Intensive foaming of the prepolymer discharged from a perforated plate and contamination of a nozzle surface and the like due to such intensive foaming were observed to an extremely small extent. The falling resin contained a large amount of bubbles. The obtained polymer had a high polymerization degree and a good color tone, containing a small amount of acetaldehyde. Thus, it was high-quality homogenous PET.

EXAMPLE 9

Polymerization was carried out under conditions described in Tables 4 and 6 in the same manner as in Example 8 with the exception that nitrogen was introduced from an inert gas feed opening 6 of a polymerization reactor 10 at an amount described in Table 6. Polymerization conditions and the properties of the obtained resin are shown in Table 6.

A prepolymer supplied to the final polymerization reactor (prepolymer 6 described in Table 1) was included in the scope of the present invention. Intensive foaming of the prepolymer discharged from a perforated plate and contamination of a nozzle surface and the like due to such intensive foaming were observed to an extremely small extent. The falling resin contained a large amount of bubbles. The obtained polymer had a high polymerization degree and a good color tone, containing a small amount of acetaldehyde. Thus, it was high-quality homogenous PET.

COMPARATIVE EXAMPLE 6

Polymerization was carried out using the apparatus shown in FIG. 4 under conditions described in Tables 5 and 6 in the same manner as in Example 8 with the exception that the amount of a polymer polymerized was decreased to 1.2 kg per hour and that the polymerization reactor 10 was not used. Polymerization conditions and the properties of the obtained resin are shown in Table 6. The obtained polymer did not have a high polymerization degree, and it was colored to become yellow, containing a large amount of acetaldehyde. It is to be noted that the results regarding the content of acetaldehyde described in Table 6 were obtained by evaluation by the dissolution-reprecipitation extraction method. When the content of acetaldehyde was evaluated again by the water extraction method, it was found to be 92 ppm.

EXAMPLE 10

Polymerization was carried out in the same manner as in Example 1 with the exception that the polymerization apparatus shown in FIG. 2 was used to introduce inert gas into a polymerization reactor using an inert gas absorption device, and that the conditions described in Table 6 were applied. In the inert gas absorption device, 9 holes each having a diameter of 1 mm were aligned in a lattice form on a perforated plate, and a wire-form support made from stainless steel, having a diameter of 5 mm, a length of 3 m, and a circular cross section (support 6 described in Table 2) was used. A single support was equipped to a single hole on the perforated plate. Nitrogen gas was supplied into the absorption device such that the pressure became 0.11 MPa, so that a prepolymer falling along the support was allowed to absorb or contain nitrogen. A transfer pump was operated, while it was observed through an observation hole such that almost no polymer was accumulated in the bottom portion of the absorption device. This time, very small bubbles were observed in a polymer transported from the absorption device. Supply of nitrogen gas into the absorption device was terminated, and a change in the pressure of the gas was examined. As a result, a pressure change corresponding to 0.5 mg of gas per gram of the polymer was observed. It was considered that this amount corresponded to the amount of nitrogen gas absorbed to or contained in the prepolymer. Assuming that the total amount was introduced into the polymerization reactor, the amount of nitrogen introduced into the polymerization reactor was determined. Polymerization conditions and the properties of the obtained resin are shown in Table 6. This time, when a falling polymer was observed through an observation hole located at the lower part, it was in a foaming state containing a large amount of bubbles. A prepolymer supplied to the final polymerization reactor was included in the scope of the present invention. Intensive foaming of the prepolymer discharged from the perforated plate and contamination of a nozzle surface and the like due to such intensive foaming were observed to an extremely small extent. The obtained polymer had a high polymerization degree and a good color tone, containing a small amount of acetaldehyde. Thus, it was high-quality homogenous PET.

EXAMPLE 11

Polymerization was carried out in the same manner as in Example 8 with the exception that polyethylene glycol having an average molecular weight of 2,000 was added to the second transesterification reactor in the apparatus shown in FIG. 4 such that the additive amount became 10% by weight based on the weight of a polymer to be obtained. Polymerization conditions and the properties of the obtained resin are shown in Table 6. A prepolymer supplied to the final polymerization reactor was included in the scope of the present invention. Intensive foaming of the prepolymer discharged from a perforated plate and contamination of a nozzle surface and the like due to such intensive foaming were observed to an extremely small extent. The falling polymer was in a foaming state containing a large amount of bubbles. The obtained polymer had a high polymerization degree and a good color tone, containing a small amount of acetaldehyde. Thus, it was high-quality homogenous PET.

EXAMPLE 12

Using the apparatus shown in FIG. 5, a PET prepolymer (prepolymer 1 described in Table 1) having an intrinsic viscosity [η] of 0.45 dl/g and a crystalline melting point of 260° C. was supplied to a polymerization reactor 10 through a feed opening 2 by a transfer pump 1, and the prepolymer that was in a molten state at 280° C. was then discharged through holes on a perforated plate 3 at an amount of 20 g/min. per hole. Subsequently, the prepolymer was polymerized under reduced pressure of 65 Pa, while it was allowed to fall along a support at the same ambient temperature as the discharge temperature, and it was then eliminated by a drainage pump 8. Thereafter, it was supplied to an injection molding machine through a transfer tube and a distributor 11 followed by injection molding, so as to obtain a plate having a thickness of 3 mm and a side of 130 mm. The perforated plate used herein had a thickness of 50 mm, and had 4 holes thereon, each having a diameter of 1 mm, which were linearly aligned at an interval of 25 mm. As a support, a wire gauze-form support (support 1 described in Table 2) was used, wherein a wire having a diameter of 2 mm and a length of 8 m was attached very close to each hole and vertically hung therefrom, and other wires each having a diameter of 2 mm and a length of 100 mm were orthogonally attached to the above wires at an interval of 15 mm. The material of the support was stainless steel. A drainage pump was operated, while it was observed through an observation hole such that almost no polymer was accumulated in the bottom portion of a polymerization reactor. A prepolymer produced by adding 0.04% by weight of diantimony trioxide and 100 ppm trimethyl phosphate (in terms of phosphorous element) was used.

Herein, only one PS40E manufactured by Nissei Plastic Industrial Co., Ltd. was used as a molding machine. No other molding machines were used, and a polymer was evacuated. A prepolymer moderately foamed in the polymerization reactor, and it contained a large amount of bubbles. Conditions for polymerization and molding and the properties of the obtained molded article are shown in Table 7. The obtained molded article had a high polymerization degree and a good color tone, and it contained a reduced amount of acetaldehyde, which was evaluated by the water extraction method. Thus, it was a high-quality PET molded article with a high polymerization degree.

EXAMPLE 13

Polymerization and molding were carried out in the same manner as in Example 12 with the exception that the conditions described in Table 7 were applied. A prepolymer moderately foamed in the polymerization reactor, and it contained a large amount of bubbles. Conditions for polymerization and molding and the properties of the obtained molded article are shown in Table 7. The obtained molded article had a high polymerization degree and a good color tone, and it contained a reduced amount of acetaldehyde, which was evaluated by the water extraction method. Thus, it was a high-quality PET molded article with a high polymerization degree.

COMPARATIVE EXAMPLES 7 TO 9

Polymerization and molding were carried out in the same manner as in Example 12 with the exception that the conditions described in Table 7 were applied. Conditions for polymerization and molding and the properties of the obtained molded articles are shown in Table 7. In the case of Comparative example 7, since the temperature of a molding machine was too high, the molded article was colored to become yellow, and it contained a large amount of acetaldehyde. In the case of Comparative example 8, since the temperature of a transfer tube was set at 210° C., which was 20° C. lower than the crystalline melting point, a polymer was solidified, and transportation of the polymer could not smoothly be carried out, so that no molded articles could be obtained. In Comparative example 9, since a transfer tube was thickened, a period of time required until molding became too long, such as 80 minutes. Thus, the obtained molded article was colored to become yellow, and also contained a large amount of acetaldehyde.

EXAMPLES 14 AND 15

In Example 14, a space lattice-form support (support 2 described in Table 2) obtained by combining wires each having a diameter of 3 mm at an interval of 30 mm in the longitudinal direction and at an interval of 50 mm in the horizontal direction, was used. In Example 15, a chain-form support (support 3 described in Table 2) obtained by connecting elliptical forms with a wire diameter of 3 mm, a length of 50 mm, and a curvature of 20 mm, was used. Other than these conditions, polymerization and molding were carried out in the same manner as in Example 12. A prepolymer moderately foamed in the polymerization reactor, and it contained a large amount of bubbles. Conditions for polymerization and molding and the properties of the obtained molded articles are shown in Table 7. The obtained molded articles had a high polymerization degree and a good color tone, and they contained a reduced amount of acetaldehyde, which was evaluated by the water extraction method. Thus, they were high-quality PET molded articles with a high polymerization degree.

EXAMPLE 16

Polymerization and molding were carried out in the same manner as in Example 12 with the exception that a preform used for a bottle was molded instead of a plate. Conditions for polymerization and molding and the properties of the obtained molded article are shown in Table 7. A prepolymer moderately foamed in the polymerization reactor, and it contained a large amount of bubbles. The obtained preform had a high polymerization degree and a good color tone, and it contained a reduced amount of acetaldehyde, which was evaluated by the water extraction method. Thus, it was a high-quality PET molded article with a high polymerization degree.

COMPARATIVE EXAMPLE 10

Polymerization and molding were carried out in the same manner as in Example 12 with the exception that a horizontal biaxial polymerization reactor having a disk-form agitation blade (not having a support) was used as a polymerization reactor. It took 2 hours to carry out polymerization. Conditions for polymerization and molding and the properties of the obtained molded article are shown in Table 7. The obtained molded article was colored to become yellow and contained a large amount of acetaldehyde.

EXAMPLE 17

Polymerization and molding were carried out in the same manner as in Example 12 with the exception that 4 g of nitrogen was introduced with respect to 1 g of a prepolymer from a gas-feed opening 6 of a polymerization reactor 10. The prepolymer considerably foamed in the polymerization reactor. Conditions for polymerization and molding and the properties of the obtained molded article are shown in Table 7. The obtained molded article had a high polymerization degree and a good color tone, and it contained a reduced amount of acetaldehyde, which was evaluated by the water extraction method. Thus, it was a high-quality PET molded article with a high polymerization degree.

EXAMPLE 18

Polymerization was carried out in the same manner as in Example 12 with the exception that a polymerization apparatus shown in FIG. 6 was used to introduce inert gas into a polymerization reactor using an inert gas absorption device, and that the conditions described in Table 7 were applied. In the inert gas absorption device, 9 holes each having a diameter of 1 mm were aligned in a lattice form on a perforated plate, and a wire-form support made from stainless steel, having a diameter of 5 mm, a length of 3 m, and a circular cross section (support 6 described in Table 2) was used. A single support was equipped to a single hole on the perforated plate. Nitrogen gas was supplied into the absorption device such that the pressure became 0.11 MPa, so that a prepolymer falling along the support was allowed to absorb and/or contain nitrogen. A transfer pump was operated, while it was observed through an observation hole such that almost no polymer was accumulated in the bottom portion of the absorption device. This time, very small bubbles were observed in a polymer transported from the absorption device. Supply of nitrogen gas into the absorption device was terminated, and a change in the pressure of the gas was examined. As a result, a pressure change corresponding to 0.5 mg of gas per gram of the polymer was observed. It was considered that this amount corresponded to the amount of nitrogen gas absorbed to or contained in the prepolymer. Assuming that the total amount was introduced into the polymerization reactor, the amount of nitrogen introduced into the polymerization reactor was obtained. The prepolymer considerably foamed in the polymerization reactor. Conditions for polymerization and molding and the properties of the obtained molded article are shown in Table 7. The obtained molded article had a high polymerization degree and a good color tone, and it contained a reduced amount of acetaldehyde, which was evaluated by the water extraction method. Thus, it was a high-quality PET molded article with a high polymerization degree.

EXAMPLE 19

A PTT prepolymer (prepolymer 8 described in Table 1) having an intrinsic viscosity [η] of 0.55 dl/g and a crystalline melting point of 230° C. was used. A 25 mm uniaxial extruder was used instead of an injection molding machine. Moreover, a T die, and a roll made from stainless steel that was cooled to 25° C., were also used, so as to obtain a film with a thickness of 200 μm. Conditions for polymerization and molding and the properties of the obtained molded article are shown in Table 7. The obtained film had a high polymerization degree and a good color tone, and it contained a small amount of acrolein, which was evaluated by the water extraction method. Thus, it was a high-quality PTT film with a high polymerization degree.

EXAMPLE 20

A PBT prepolymer (prepolymer 9 described in Table 1) having an intrinsic viscosity [η] of 0.50 dl/g and a crystalline melting point of 228° C. was used. A spinning nozzle having 10 holes with a bore of 1 mmϕ was used instead of a T die. A water bath and a pickup roll were also used, so as to obtain a monofilament. Conditions for polymerization and molding and the properties of the obtained molded article are shown in Table 7. The obtained filament had a high polymerization degree and a good color tone, and no tetrahydrofuran was detected by the water extraction method. Thus, it was a high-quality PBT filament with a high polymerization degree.

EXAMPLE 21

Using the apparatus shown in FIG. 5, a PET prepolymer (prepolymer 10 described in Table 1) that was in a molten state at 270° C., having an intrinsic viscosity [η] of 0.56 dl/g and a crystalline melting point of 256° C. and containing a 0.16 mol/kg diethylene glycol component, was supplied to a polymerization reactor 10 through a feed opening 2 by a transfer pump 1. Thereafter, the prepolymer was discharged through holes on a perforated plate 3 at an amount supplied of 1.4 kg/hour. Subsequently, the prepolymer was polymerized under reduced pressure of 50 Pa, while it was allowed to fall along a support at an ambient temperature of 255° C.

The perforated plate used herein had a thickness of 50 mm, and had 4 holes thereon, each having a diameter of 1 mm, which were linearly aligned at an interval of 15 mm. As a support, a wire gauze-form support (support 7 described in Table 2) was used, wherein a wire made from stainless steel, having a diameter of 2 mm and a length of 8.7 m, was attached very close to each hole and vertically hung therefrom, and other wires each having a diameter of 2 mm and a length of 45 mm were orthogonally attached to the above wires at an interval of 25 mm. A prepolymer was allowed to fall in a polymerization reactor while it moderately foamed, and it contained a large amount of bubbles. The residence time was 70 minutes. The residence time was calculated by dividing the amount of a resin remaining in the polymerization reactor by the amount of a resin supplied. The resin that reached the bottom portion of the polymerization reactor was eliminated by a drainage pump 8, while it was observed through an observation hole such that almost no resin was accumulated in the bottom portion of the polymerization reactor. The resin eliminated by the drainage pump 8 was cooled in a water bath, and it was then granulated with a strand cutter. Polymerization conditions and the properties of the obtained resin are shown in Table 8. The obtained resin had a high polymerization degree and a good color tone, and it contained a small amount of acetaldehyde, which was evaluated by the water extraction method. Thus, it was a high-quality PET resin.

A strand pellet of the obtained PET resin was dried at 260° C. Thereafter, the resultant product was subjected to bottle molding, using a biaxial stretch blow molding machine (SBIII-100H-15 manufactured by Aoki Technical Laboratory, Inc.). Molding conditions were a molding temperature of 280° C., an injection time of 7 seconds, a cooling time of 3 seconds, and a cycle of 18 seconds. From the molding of a preform to the molding of a hollow body, the operations were continuously carried out. Molding conditions and the properties of the obtained preform and hollow body are shown in Table 9. The obtained molded article had a good color tone, and it contained an extremely small amount of acetaldehyde, which was evaluated by the water extraction method. Thus, it was a high-quality PET hollow body.

EXAMPLE 22

Polymerization was carried out in the same manner as in Example 21 with the exception that the conditions described in Table 8 were applied. Polymerization conditions and the properties of the obtained resin are shown in Table 8. A prepolymer moderately foamed in a polymerization reactor, and it contained a large amount of bubbles. The obtained resin had a good color tone, and it contained an extremely small amount of acetaldehyde, which was evaluated by the water extraction method. Thus, it was a high-quality PET resin.

EXAMPLE 23

Polymerization and molding were carried out in the same manner as in Example 21 with the exception that the conditions described in Tables 8 and 9 were applied. Nitrogen was introduced from an inert gas feed opening 6 of a polymerization reactor 10 at an amount described in Table 8. Polymerization conditions and the properties of the obtained resin are shown in Table 8. Molding conditions and the properties of the obtained preform and hollow body are shown in Table 9. A prepolymer highly foamed in the polymerization reactor by introduction of nitrogen into the reactor. Thus, a high-quality PET resin was obtained, which had a high polymerization degree suitable for bottle molding and a good color tone and contained a small amount of acetaldehyde, which was evaluated by the water extraction method.

In addition, the obtained molded article was a high-quality PET hollow body, which had a good color tone and contained a much smaller amount of acetaldehyde than that of a molded article produced from a solid phase polymerization PET, which was evaluated by the water extraction method.

EXAMPLES 24 TO 26

Polymerization was carried out in the same manner as in Example 21, except for application of the conditions shown in Table 8 and the structures of a perforated plate and a support. The perforated plate had a thickness of 50 mm, and had 7 holes thereon, each having a diameter of 1 mm, which were linearly aligned at an interval of 10 mm. As a support, a wire gauze-form support (support 8 described in Table 2) was used, wherein a wire having a diameter of 2 mm and a length of 8.7 m was attached very close to each hole and vertically hung therefrom, and other wires each having a diameter of 2 mm and a length of 60 mm were orthogonally attached to the above wires at an interval of 40 mm. The material of the support was stainless steel. Polymerization conditions and the properties of the obtained resins are shown in Table 8. A prepolymer moderately foamed in the polymerization reactor, and it contained a large amount of bubbles. The obtained resin had a good color tone, and it contained a small amount of acetaldehyde, which was evaluated by the water extraction method. Thus, it was a high-quality PET resin.

In Example 24, polymerization was continuously carried out for 140 hours, and it was confirmed that operations could stably be carried out for such a period of time. During operations, a fluctuation in the intrinsic viscosity [ηq] of the PET resin was ±0.02 dl/g or less.

EXAMPLE 27

Using the apparatus shown in FIG. 5, a PET prepolymer having an intrinsic viscosity [η] of 0.49 dl/g and a crystalline melting point of 255° C. (prepolymer 13 described in Table 1; a copolymerized PET prepolymer produced by copolymerizing 2 mol % dimethyl isophthalate to dimethyl terephthalate as a material, and adding, as polycondensation reaction catalysts, 0.04% by weight of diantimony trioxide and 100 ppm trimethyl phosphate (in terms of phosphorous element)) was supplied to a polymerization reactor 10 through a feed opening 2 by a transfer pump 1. Thereafter, the prepolymer that was in a molten state at 270° C. was then discharged through holes on a perforated plate 3 at an amount of 6 kg/hr. Subsequently, the prepolymer was polymerized under reduced pressure of 50 Pa, while it was allowed to fall along a support at an ambient temperature of 255° C. Thereafter, it was eliminated by a drainage pump 8, and then supplied to an injection molding machine through a transfer tube and a distributor I1 followed by injection molding, so as to obtain a preform. The perforated plate used herein had a thickness of 50 mm, and had 14 holes in total thereon. That is to say, two lines, a line of which consists of 7 holes, each having a diameter of 1 mm, which were linearly aligned at an interval of 10 mm, were aligned in parallel at an interval of 70 mm. As a support, a wire gauze-form support (support 9 described in Table 2) was used, wherein a wire having a diameter of 2 mm and a length of 8.7 m was attached very close to each hole and vertically hung therefrom, and other wires each having a diameter of 2 mm and a length of 60 mm were orthogonally attached to the above wires at an interval of 70 mm. The material of the support was stainless steel.

A drainage pump was operated, while it was observed through an observation hole such that almost no polymer remained in the bottom portion of the polymerization reactor. Herein, only a biaxial stretch blow molding machine (SBIII-100H-15 manufactured by Aoki Technical Laboratory, Inc.) was used as a molding machine. No other molding machines were used, and excessively generated polymers were eliminated using the distributor. Molding conditions were a molding temperature of 280° C., an injection time of 7 seconds, a cooling time of 3 seconds, and a cycle of 18 seconds. From the molding of a preform to the molding of a hollow body, the operations were continuously carried out. The polymers eliminated using the distributor were cooled in a water bath, and they were then granulated with a strand cutter and collected. A prepolymer moderately foamed in the polymerization reactor, and it contained a large amount of bubbles. Polymerization conditions and the properties of the obtained resin are shown in Table 8. Molding conditions and the properties of the obtained preform and hollow body are shown in Table 9. The obtained molded article had a high polymerization degree and a good color tone, and it contained a small amount of acetaldehyde, which was evaluated by the water extraction method. Thus, it was a high-quality PET molded article with a high polymerization degree.

EXAMPLES 28 AND 29

Polymerization and molding were carried out in the same manner as in Example 27 with the exception that the conditions shown in Tables 8 and 9 were applied. Polymerization conditions and the properties of the obtained resin are shown in Table 8. Molding conditions and the properties of the obtained preform and hollow body are shown in Table 9. A prepolymer highly foamed in the polymerization reactor, and it contained a large amount of bubbles. Thus, a high-quality PET resin was obtained, which had a high polymerization degree suitable for bottle molding and a good color tone and contained a small amount of acetaldehyde, which was evaluated by the water extraction method. In addition, the obtained molded article was a high-quality PET hollow body, which had a good color tone and contained a much smaller amount of acetaldehyde than that of a molded article produced from a solid phase polymerization PET. In Example 29, the residence time of a polymer in a transfer tube was reduced by increasing a polymerization rate. It also suggested a possibility of a further reduction of the content of acetaldehyde in the obtained molded article.

COMPARATIVE EXAMPLES 11 TO 13

Polymerization was carried out in the same manner as in Example 21 with the exception that the conditions shown in Table 8 were applied. Moldable polymerized products (Comparative examples 11 to 13) were molded in the same manner as in Example 21. Polymerization conditions and the properties of the resins are shown in Table 8. In Comparative example 11, since the temperature of a polymerization reactor was too high, a polymer discharged from a perforated plate intensively foamed, and thus, it contaminated a nozzle surface or the wall of the polymerization reactor. The polymerized product was colored to become yellow, and it contained a large amount of acetaldehyde. The molded article was significantly colored, and it contained a large amount of acetaldehyde. Accordingly, it was not suitable as a container used for beverages and the like. In Comparative example 12, since the intrinsic viscosity [η] of a prepolymer was too low, the polymer discharged from a perforated plate intensively foamed, and thus, significantly contaminated a nozzle surface or the wall of a polymerization reactor. The obtained polymer contained large quantities of black foreign substances (heat deterioration products). Also, it had a low polymerization degree.

In Comparative example 13, a support was removed from a polymerization reactor 10, and a prepolymer was allowed to fall from a perforated plate 3 in the form of a strand. The strand was often cut by foaming of the polymer discharged from the perforated plate, and as a result, a nozzle surface or the wall of the polymerization reactor was significantly contaminated. The obtained polymer contained large quantities of black foreign substances (heat deterioration products). The molded article was significantly colored, and it contained black foreign substances. Accordingly, it was not suitable as a container used for beverages and the like.

COMPARATIVE EXAMPLE 14

The resin properties of commercially available solid phase polymerization PET used for a bottle (J135 manufactured by Mitsui Chemicals, Inc.), and the properties of a molded article obtained by molding the above PET in the same manner as in Example 21, were evaluated. The properties of the resin are shown in Table 8, and molding conditions and the properties of a preform and a hollow body are shown in Table 9. When the preform was molded, a significant increase in the content of acetaldehyde was observed. Although it is a bottle produced from solid phase polymerization PET, if it is used for a container for beverage and the like, a technique of reducing the content of acetaldehyde impairing the flavor of the contents thereof is required.

Mw/Mn of the resin was 2.4 before molding. However, Mw/Mn of the resin of the molded article thereof was changed to 2.0. This is because a polymer locally having a high molecular weight, such as one located in the surface portion of the pellet of solid phase polymerization PET and the like, was equalized in terms of molecular weight by transesterification or the like during molding. However, since such a transesterification or the like progresses at a different degree, depending on conditions for storage of a pellet, drying conditions before melt processing, or melt processing conditions such as a melt temperature, the polymerization degree of the pellet obtained immediately after the production and the polymerization degree of the resin during melt processing or the resin in a melt processed product are likely to fluctuate. Thus, it is problematic in that the design of a melt processed product becomes difficult or that the quality thereof fluctuates.

EXAMPLE 30

A PET resin having an intrinsic viscosity [η] of 0.81 produced in Example 24, a prepolymer 10 used as a material in Example 24 (produced by the melt polymerization method and having an intrinsic viscosity [η] of 0.56), and a PET resin having an intrinsic viscosity [η] of 0.81 produced by solid phase polymerization of the prepolymer 10, were evaluated in terms of the content of oligomer and crystallization velocity. The results are shown in Table 10. It was confirmed that the crystallization time of the PET resin in Example 24 can be significantly reduced when compared with that of a solid phase polymerization PET resin.

TABLE 1

Properties of prepolymer

|  | Type | Intrinsic viscosity (dl/g) | COOH (meq/kg) | Crystalline melting point (° C.) |
|---|---|---|---|---|
| Prepolymer 1 | PET | 0.45 | 30 | 260 |
| Prepolymer 2 | PET | 0.60 | 40 | 259 |
| Prepolymer 3 | PET | 0.45 | 30 | 261 |
| Prepolymer 4 | PET | 0.18 | 5 | 260 |
| Prepolymer 5 | PET | 0.40 | 50 | 257 |
| Prepolymer 6 | PET | 0.60 | 40 | 260 |
| Prepolymer 7 | PET | 0.45 | 30 | 256 |
| Prepolymer 8 | PTT | 0.55 | 54 | 230 |
| Prepolymer 9 | PBT | 0.50 | 61 | 228 |
| Prepolymer 10 | PET | 0.56 | 39 | 256 |
| Prepolymer 11 | PET | 0.44 | 43 | 256 |
| Prepolymer 12 | PET | 0.49 | 42 | 256 |
| Prepolymer 13 | PET | 0.49 | 40 | 255 |

COOH: carboxyl-terminal group concentration of prepolymer (meq/kg polymer)

TABLE 2

|  | Shape of support | Vertical direction | | | | Horizontal direction | | |
|---|---|---|---|---|---|---|---|---|
|  |  | Wire diameter (mm) | Length (m) | Number of wires (wires) | Disposition interval (mm) | Wire diameter (mm) | Length (mm) | Disposition interval (mm) |
| Support 1 | Lattice | 2 | 8.0 | 4 | 25 | 2 | 100 | 15 |
| Support 2 | Lattice | 3 | 8.0 | 4 | 50 × 50 | 3 | 30 | 30 |
| Support 3 | Chain | 3 | 8.0 | 4 | 50 × 50 | — | — | — |
| Support 4 | Wire | 5 | 8.0 | 4 | 50 × 50 | — | — | — |
| Support 5 | Pipe (inside diameter: 15 cm) | — | 8.0 | 1 | — | — | — | — |
| Support 6 | Wire | 5 | 3.0 | 9 | 50 × 50 | — | — | — |
| Support 7 | Lattice | 2 | 8.7 | 4 | 15 | 2 | 45 | 25 |
| Support 8 | Lattice | 2 | 8.7 | 7 | 10 | 2 | 60 | 40 |
| Support 9 | Lattice | 2 | 8.7 | 14 | 10 × 70 | 2 | 60 | 70 |

TABLE 3

|  | Temperature (° C.) | Residence time (min) | Degree of vacuum (Pa) | Intrinsic viscosity (dl/g) |
|---|---|---|---|---|
| Esterification reactor | 260 | 180 | Normal pressure | — |
| First agitation vessel polymerization reactor | 280 | 60 | 20000 | 0.15 |
| Secondary agitation vessel polymerization reactor | 285 | 60 | 300 | 0.40 |

TABLE 4

|  | Temperature (° C.) | Residence time (min) | Degree of vacuum (Pa) | Intrinsic viscosity (dl/g) |
|---|---|---|---|---|
| First transesterification reactor | 190 | 120 | Normal pressure | — |
| Secondary transesterification reactor | 230 | 120 | Normal pressure | — |
| First agitation vessel polymerization reactor | 280 | 60 | 10000 | 0.15 |
| Horizontal agitating polymerization reactor | 285 | 60 | 100 | 0.60 |

TABLE 5

|  | Temperature (° C.) | Residence time (min) | Degree of vacuum (Pa) | Intrinsic viscosity (dl/g) |
|---|---|---|---|---|
| First transesterification reactor | 190 | 120 | Normal pressure | — |

TABLE 5-continued

| | Temperature (° C.) | Residence time (min) | Degree of vacuum (Pa) | Intrinsic viscosity (dl/g) |
|---|---|---|---|---|
| Secondary transesterification reactor | 230 | 120 | Normal pressure | — |
| First agitation vessel polymerization reactor | 280 | 120 | 10000 | 0.25 |
| Horizontal agitating polymerization reactor | 285 | 120 | 50 | 0.70 |

TABLE 6

| | Polymerization conditions | | | | | | | |
|---|---|---|---|---|---|---|---|---|
| | Prepolymer | Structure of support | Polymerization rate (kg/h) | Temperature (° C.) | Pressure (Pa) | Nitrogen (mg/g) | Foaming state | Contamination state |
| Example 1 | Prepolymer 1 | Support 1 | 2.4 | 285 | 65 | 0 | ○ | ○ |
| Example 2 | Prepolymer 2 | Support 1 | 2.4 | 285 | 65 | 0 | ○ | ○ |
| Example 3 | Prepolymer 3 | Support 1 | 2.4 | 275 | 65 | 0 | ○ | ○ |
| Example 4 | Prepolymer 1 | Support 2 | 5.5 | 285 | 65 | 0 | ○ | ○ |
| Example 5 | Prepolymer 1 | Support 3 | 5.5 | 285 | 65 | 0 | ○ | ○ |
| Example 6 | Prepolymer 1 | Support 4 | 5.5 | 285 | 65 | 0 | ○ | ○ |
| Example 7 | Prepolymer 5 | Support 1 | 2.4 | 285 | 65 | 0 | ○ | ○ |
| Example 8 | Prepolymer 6 | Support 1 | 2.4 | 285 | 65 | 0 | ○ | ○ |
| Example 9 | Prepolymer 6 | Support 1 | 2.4 | 285 | 100 | 5 | ○ | ○ |
| Example 10 | Prepolymer 1 | Support 6 | 2.4 | 285 | 65 | 0.5 | ○ | ○ |
| Example 11 | Prepolymer 7 | Support 1 | 2.4 | 285 | 65 | 0 | ○ | ○ |
| Comparative example 1 | Prepolymer 1 | Support 1 | 2.4 | 340 | 65 | 0 | X | X |
| Comparative example 2 | Prepolymer 1 | Support 1 | 2.4 | 245 | 65 | 0 | — | — |
| Comparative example 3 | Prepolymer 4 | Support 1 | 2.4 | 285 | 65 | 0 | X | X |
| Comparative example 4 | Prepolymer 1 | Support 1 | 2.4 | 285 | Normal pressure | 0 | None | ○ |
| Comparative example 5 | Prepolymer 1 | Support 5 | 2.4 | 285 | 65 | 0 | None | X |
| Comparative example 6 | — | — | — | — | — | — | — | — |

| | Properties of resin | | | | |
|---|---|---|---|---|---|
| | AA content 1 (ppm) | Hue b* value | Hue L* value | Instrinsic viscosity (dl/g) | Mw/Mn |
| Example 1 | 25 | 5 | 80 | 0.85 | 2.0 |
| Example 2 | 30 | 8 | 83 | 0.95 | 2.0 |
| Example 3 | 20 | 3 | 81 | 0.80 | 2.0 |
| Example 4 | 25 | 6 | 82 | 0.88 | 2.0 |
| Example 5 | 25 | 4 | 78 | 0.89 | 2.0 |
| Example 6 | 25 | 2 | 75 | 0.75 | 2.0 |
| Example 7 | 35 | 8 | 80 | 0.80 | 2.0 |
| Example 8 | 30 | 5 | 78 | 0.98 | 2.0 |
| Example 9 | 25 | 7 | 85 | 1.08 | 2.0 |
| Example 10 | 25 | 5 | 82 | 0.88 | 2.0 |
| Example 11 | 30 | 8 | 85 | 0.83 | 2.0 |
| Comparative example 1 | 70 | Uneven | Uneven | 0.50 | 2.1 |
| Comparative example 2 | — | — | — | — | — |
| Comparative example 3 | 25 | Uneven | Uneven | 0.23 | 2.2 |
| Comparative example 4 | 80 | 14 | 85 | 0.41 | 2.1 |

TABLE 6-continued

|  |  |  |  |  |  |
|---|---|---|---|---|---|
| Comparative example 5 | 63 | 10 | 73 | 0.55 | 2.3 |
| Comparative example 6 | 75 | 15 | 80 | 0.70 | 2 |

[Remarks]

COOH: carboxyl-terminal group concentration of polymer (meq/kg polymer)

Nitrogen: the weight of nitrogen absorbed to and/or contained in prepolymer (mg/g polymer)

Foaming state: ○ = Foaming of a prepolymer is not intensive, and the foaming state is continued.

X = Intensive foaming occurs, and a prepolymer thereby attaches to a nozzle surface or wall.

None = Foaming occurs at a low frequency, and the foaming state is not continued.

Contamination state: ○ = No contamination is observed on a nozzle surface or wall.

X = Contamination is observed on a nozzle surface or wall.

AA content 1: the content of acetaldehyde (ppm) evaluated by dissolution-reprecipitation extraction method

TABLE 7

| | | | Polymerization conditions | | | | | |
|---|---|---|---|---|---|---|---|---|
| | Prepolymer | Structure of support | Polymerization rate (kg/h) | Temperature (° C.) | Pressure (Pa) | Nitrogen (mg/g) | Foaming state | Contamination state |
| Example 12 | Prepolymer 1 | Support 1 | 4.8 | 280 | 65 | 0 | ○ | ○ |
| Example 13 | Prepolymer 1 | Support 1 | 4.8 | 295 | 65 | 0 | ○ | ○ |
| Example 14 | Prepolymer 1 | Support 2 | 4.8 | 280 | 65 | 0 | ○ | ○ |
| Example 15 | Prepolymer 1 | Support 3 | 4.8 | 280 | 65 | 0 | ○ | ○ |
| Example 16 | Prepolymer 1 | Support 1 | 4.8 | 280 | 65 | 0 | ○ | ○ |
| Example 17 | Prepolymer 1 | Support 1 | 4.8 | 280 | 65 | 4 | ○ | ○ |
| Example 18 | Prepolymer 1 | Support 6 | 4.8 | 280 | 65 | 0.5 | ○ | ○ |
| Example 19 | Prepolymer 8 | Support 1 | 4.8 | 245 | 65 | 0 | ○ | ○ |
| Example 20 | Prepolymer 9 | Support 1 | 4.8 | 240 | 65 | 0 | ○ | ○ |
| Comparative example 7 | Prepolymer 1 | Support 1 | 4.8 | 280 | 65 | 0 | ○ | ○ |
| Comparative example 8 | Prepolymer 1 | Support 1 | 4.8 | 280 | 65 | 0 | ○ | ○ |
| Comparative example 9 | Prepolymer 1 | Support 1 | 4.8 | 280 | 65 | 0 | ○ | ○ |
| Comparative example 10 | Prepolymer 1 | — | 4.8 | 280 | 65 | — | — | — |

| | | Molding conditions | | Properties of molded article | | |
|---|---|---|---|---|---|---|
| | Type | Molding temperature (° C.) | Molding time (min) | Hue (b* value) | Intrinsic viscosity (dl/g) | Content of impurities (ppm) |
| Example 12 | Plate | 280 | 15 | 2 | 0.85 | 8 |
| Example 13 | Plate | 295 | 15 | 7 | 0.88 | 23 |
| Example 14 | Plate | 280 | 15 | 3 | 0.95 | 12 |
| Example 15 | Plate | 280 | 15 | 1 | 0.90 | 7 |
| Example 16 | Preform | 280 | 15 | 2 | 0.85 | 10 |
| Example 17 | Plate | 280 | 15 | 4 | 1.00 | 10 |
| Example 18 | Plate | 280 | 15 | 3 | 0.90 | 9 |
| Example 19 | Film | 250 | 10 | 8 | 1.30 | 15 |
| Example 20 | Fiber | 260 | 15 | 5 | 1.20 | n.d. |
| Comparative example 7 | Plate | 320 | 15 | 16 | 0.80 | 80 |
| Comparative example 8 | Plate | 210 | — | — | — | — |
| Comparative example 9 | Plate | 280 | 80 | 13 | 0.81 | 75 |
| Comparative example 10 | Plate | 280 | 15 | 10 | 0.78 | 50 |

[Remarks]

Nitrogen: the weight of nitrogen absorbed to and/or contained in prepolymer (mg/g polymer)

Foaming state: ○ = Foaming of a prepolymer is not intensive, and the foaming state is continued.

X = Intensive foaming occurs, and a prepolymer thereby attaches to a nozzle surface or wall.

None = Foaming occurs at a low frequency, and the foaming state is not continued.

Contamination state: ○ = No contamination is observed on a nozzle surface or wall.

X = Contamination is observed on a nozzle surface or wall.

Content of impurities: the content of acetaldehyde (PET), acrolein (PTT), and tetrahydrofuran (PBT), evaluated by water extraction method.

TABLE 8

| | | | Polymerization conditions | | | | | |
|---|---|---|---|---|---|---|---|---|
| | Prepolymer | Structure of support | Polymerization rate (kg/h) | Temperature (° C.) | Pressure (Pa) | Nitrogen (mg/g) | Foaming state | Contamination state |
| Example 21 | Prepolymer 10 | Support 7 | 1.4 | 255 | 50 | 0 | ○ | ○ |
| Example 22 | Prepolymer 11 | Support 7 | 3.8 | 260 | 50 | 0 | ○ | ○ |
| Example 23 | Prepolymer 11 | Support 7 | 3.8 | 260 | 60 | 0.5 | ○ | ○ |
| Example 24 | Prepolymer 10 | Support 8 | 2.0 | 255 | 100 | 0 | ○ | ○ |
| Example 25 | Prepolymer 11 | Support 8 | 1.5 | 255 | 40 | 0 | ○ | ○ |
| Example 26 | Prepolymer 12 | Support 8 | 3.3 | 255 | 50 | 0 | ○ | ○ |
| Example 27 | Prepolymer 13 | Support 9 | 6.0 | 255 | 50 | 0 | ○ | ○ |
| Example 28 | Prepolymer 11 | Support 9 | 6.0 | 255 | 50 | 0 | ○ | ○ |
| Example 29 | Prepolymer 11 | Support 9 | 10.0 | 255 | 40 | 0 | ○ | ○ |
| Comparative example 11 | Prepolymer 10 | Support 7 | 1.4 | 320 | 50 | 0 | X | X |
| Comparative example 12 | Prepolymer 4 | Support 7 | 1.4 | 260 | 50 | 0 | X | X |
| Comparative example 13 | Prepolymer 10 | No supports used | 1.4 | 260 | 50 | 0 | X | X |
| Comparative example 14 | — | — | — | — | — | — | — | — |

| | Properties of resin | | | | |
|---|---|---|---|---|---|
| | AA content 2 | Hue of resin solution | | Intrinsic viscosity | |
| | (ppm) | b value | L value | (dl/g) | Mw/Mn |
| Example 21 | 9.9 | 0.20 | 99.64 | 0.83 | 2.0 |
| Example 22 | 5.7 | 0.22 | 99.61 | 0.55 | 2.0 |
| Example 23 | 5.9 | 0.17 | 99.73 | 0.64 | 1.9 |
| Example 24 | 10.0 | 0.19 | 99.66 | 0.81 | 2.0 |
| Example 25 | 3.9 | 0.16 | 99.70 | 0.64 | 2.0 |
| Example 26 | 5.4 | 0.17 | 99.68 | 0.73 | 2.0 |
| Example 27 | 3.0 | 0.49 | 98.12 | 0.79 | 2.0 |
| Example 28 | 1.1 | 0.16 | 99.71 | 0.70 | 2.0 |
| Example 29 | 1.3 | 0.22 | 99.64 | 0.68 | 2.0 |
| Comparative example 11 | 86.3 | 3.32 | 96.23 | 0.71 | 2.2 |
| Comparative example 12 | 4.8 | Uneven | Uneven | 0.23 | 2.2 |
| Comparative example 13 | 15.2 | Uneven | Uneven | 0.58 | 2.4 |
| Comparative example 14 | 5.0 | 0.14 | 99.71 | 0.80 | 2.4 |

[Remarks]
Nitrogen: the weight of nitrogen absorbed to and/or contained in prepolymer (mg/g polymer)
Foaming state: ○ = Foaming of a prepolymer is not intensive, and the foaming state is continued.
X = Intensive foaming occurs, and a prepolymer thereby attaches to a nozzle surface or wall.
None = Foaming occurs at a low frequency, and the foaming state is not continued.
Contamination state: ○ = No contamination is observed on a nozzle surface or wall.
X = Contamination is observed on a nozzle surface or wall.
AA content 2: the content of acetaldehyde (ppm) evaluated by water extraction method.
Hue of resin solution: Value obtained by analyzing and evaluating HFIP solution containing sample (13 wt %) by optical transmission method.

TABLE 9

| | Molding conditions | | | Properties of preform | | | |
|---|---|---|---|---|---|---|---|
| | Molding temperature (° C.) | Transporting time (min) | Molding method | AA content 2 (ppm) | Hue of resin solution | | Intrinsic viscosity (dl/g) |
| | | | | | b value | L value | |
| Example 21 | 280 | — | Pellet | 13.6 | 0.24 | 99.42 | 0.79 |
| Example 23 | 280 | — | Pellet | 9.3 | 0.26 | 99.22 | 0.62 |
| Example 27 | 280 | 8.9 | Direct | 17.9 | 0.56 | 98.08 | 0.76 |
| Example 28 | 280 | 8.9 | Direct | 14.5 | 0.19 | 99.69 | 0.68 |
| Example 29 | 280 | 5.3 | Direct | 11.2 | 0.25 | 99.63 | 0.66 |
| Comparative example 11 | 280 | — | Pellet | 80.2 | 3.40 | 96.01 | 0.67 |

TABLE 9-continued

| | | | | | | | |
|---|---|---|---|---|---|---|---|
| Comparative example 13 | 280 | — | Pellet | 19.3 | Uneven | Uneven | 0.52 |
| Comparative example 14 | 280 | — | Pellet | 22.1 | 0.16 | 99.69 | 0.76 |

| | Properties of hollow body | | | |
|---|---|---|---|---|
| | AA content 2 | Hue of resin solution | | Intrinsic viscosity |
| | (ppm) | b value | L value | (dl/g) |
| Example 21 | 9.0 | 0.26 | 99.46 | 0.79 |
| Example 23 | 4.8 | 0.28 | 99.24 | 0.62 |
| Example 27 | 14.8 | 0.57 | 98.07 | 0.76 |
| Example 28 | 9.6 | 0.20 | 99.68 | 0.68 |
| Example 29 | 6.4 | 0.26 | 99.61 | 0.66 |
| Comparative example 11 | 71.2 | 3.42 | 95.99 | 0.67 |
| Comparative example 13 | 15.6 | Uneven | Uneven | 0.50 |
| Comparative example 14 | 17.2 | 0.17 | 99.67 | 0.75 |

[Remarks]
Molding temperature: barrel temperature in molding machine
Transporting time: a time required from elimination of resin by drainage pump 8 to molding of a perform, in a case where a polymerized resin that is in a molten state is introduced into a molding machine, followed by molding
Molding method: pellet = a method of supplying a pelletized resin from a hopper in a molding machine, followed by molding
Direct = a method of introducing a polymerized resin that is in a molten state into a molding machine through a transfer tube and a distributor, followed by molding
AA content 2: the content of acetaldehyde (ppm) evaluated by water extraction method
Hue of resin solution: Value obtained by analyzing and evaluating HFIP solution containing sample (13 wt %) by optical transmission method

TABLE 10

| | Intrinsic viscosity (dl/g) | Content of oligomer (wt %) | Crystallization time (min) |
|---|---|---|---|
| Prepolymer 10 | 0.56 | 1.9 | 2.17 |
| PET resin in Example 24 | 0.81 | 1.8 | 2.10 |
| PET resin obtained by solid phase polymerizetion of prepolymer 10 | 0.81 | 0.4 | 4.10 |

The invention claimed is:

1. A method of producing polyalkylene terephthalate, which comprises: introducing a prepolymer of polyalkylene terephthalate that is in a molten state comprising 70 mol % or more of ethylene terephthalate or 1,4-butylene terephthalate repeating units and having an intrinsic viscosity [η] between 0.2 and 2 dl/g through a feed opening into a polymerization reactor; discharging the introduced prepolymer through holes of a perforated plate; and then polymerizing the prepolymer under reduced pressure, while allowing the prepolymer to fall along the surface of a support that is open towards the outside at a temperature between the [crystalline melting point −10° C.] of the prepolymer or higher and the [crystalline melting point +30° C.] of the prepolymer or lower under the conditions represented by the following formula (1);

$$S_1/S_2 > 1 \quad (1)$$

wherein $S_1$: the surface area of falling polyalkylene terephthalate, and $S_2$: the area where the support is in contact with polyalkylene terephthalate.

2. The method of producing polyalkylene terephthalate according to claim 1, wherein the prepolymer of polyalkylene terephthalate used in polymerization has an intrinsic viscosity [η] between 0.4 and 2.0 dl/g and a carboxyl-terminal group concentration of the prepolymer of 150 meq/kg or less.

3. The method of producing polyalkylene terephthalate according to claim 1, which comprises introducing inert gas into a polymerization reactor by either the following step (A) or (B), or by both steps, and at the same time polymerizing the prepolymer of polyalkylene terephthalate under reduced pressure, while allowing the prepolymer to fall along the support;
(A) directly introducing the inert gas into the polymerization reactor that is under reduced pressure; and
(B) discharging under reduced pressure the prepolymer of polyalkylene terephthalate that has previously absorbed and/or contained the inert gas, so as to release the inert gas, thereby introducing it into the polymerization reactor.

4. A method of producing a molded article of polyalkylene terephthalate comprising 70 mol % or more of alkylene terephthalate repeating units, which comprises: introducing a prepolymer of polyalkylene terephthalate that is in a molten state into a polymerization reactor; polymerizing the prepolymer under reduced pressure, while allowing the prepolymer to fall along the surface of a support that is open towards the outside; and then transporting the prepolymer in molten state to a molding machine followed by performing melt molding.

5. The method of producing a molded article of polyalkylene terephthalate according to claim 4, wherein the molded article of polyalkylene terephthalate is one or more selected from the group consisting of a preform for molding a hollow body, a hollow body, a film, a sheet, a fiber, and a pellet.

6. A molded article of polyalkylene terephthalate, which is produced by the method according to claim 4.

7. The molded article of polyalkylene terephthalate according to claim 6, wherein the molded article of polyalkylene terephthalate is one or more selected from the group consisting of a preform for molding a hollow body, a hollow body, a film, a sheet, a fiber, and a pellet.

8. Polyethylene terephthalate comprising 70 mol % or more of ethylene terephthalate repeating units, which has the following characteristics (C) to (F):

(C) an intrinsic viscosity [η] ranging between 0.5 and 2.0 dl/g;
(D) a molecular weight distribution represented by Mw/Mn ranging between 1.8 and 2.2;
(E) an L-value and a b-value, which are obtained by measuring optical transmission of a solution prepared by dissolving the polyethylene terephthalate in HFIP at a concentration of 13% by weight, ranging between 99 and 100, and between −0.5 and 0.5, respectively; and
(F) the content of acetaldehyde at 10 ppm or less.

9. The polyethylene terephthalate according to claim 8, wherein the amount of oligomers contained in the polyethylene terephthalate is within a range between 0.5 and 5.0% by weight.

10. A molded article of polyethylene terephthalate produced from the polyethylene terephthalate according to claim 8, which has a form selected from the group consisting of a preform for molding a hollow body, a hollow body, a film, a sheet, a fiber, and a pellet.

11. The molded article of polyethylene terephthalate according to claim 10, wherein said molded article of polyethylene terephthalate is a pellet, and the content of acetaldehyde in a molded article obtained by injection molding of the pellet at a molding temperature of 280° C. is 15 ppm or less.

* * * * *